US012746852B2

(12) United States Patent
Cheng et al.

(10) Patent No.: US 12,746,852 B2
(45) Date of Patent: Sep. 29, 2026

(54) ENERGY MANAGEMENT METHOD, SYSTEM, COMPUTER DEVICE AND READABLE STORAGE MEDIUM

(71) Applicant: The Hong Kong Polytechnic University, Hong Kong (CN)

(72) Inventors: Ka Wai Eric Cheng, Hong Kong (CN); Xiangdang Xue, Hong Kong (CN); Molly Meng-Jung Li, Hong Kong (CN); Chiu Shek Wong, Hong Kong (CN); Shu Ping Lau, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 61 days.

(21) Appl. No.: 18/932,705

(22) Filed: Oct. 31, 2024

(65) Prior Publication Data

US 2025/0162466 A1 May 22, 2025

(30) Foreign Application Priority Data

Nov. 22, 2023 (WO) ................ PCT/CN2023/133400

(51) Int. Cl.
*B60L 58/40* (2019.01)
*B60L 1/12* (2006.01)
(Continued)

(52) U.S. Cl.
CPC ................. *B60L 58/40* (2019.02); *B60L 1/12* (2013.01); *B60L 50/40* (2019.02); *B60L 50/75* (2019.02);
(Continued)

(58) Field of Classification Search
CPC .......... B60L 58/12; B60L 58/40; B60L 50/40; B60L 50/75; B60L 1/12; H02J 7/345; H02J 7/855; H02J 2207/50
(Continued)

(56) References Cited

U.S. PATENT DOCUMENTS 6,223,546 B1 * 5/2001 Chopko .................... B60P 3/20 62/297
6,253,563 B1 7/2001 Ewert et al.
(Continued)

FOREIGN PATENT DOCUMENTS

CN 101374684 A 2/2009
CN 202613895 U 12/2012
(Continued)

OTHER PUBLICATIONS

English translation of International Search Report mailed on Mar. 19, 2025 in PCT/CN2024/137112.
(Continued)

*Primary Examiner* — Hal Kaplan
(74) *Attorney, Agent, or Firm* — Fox Rothschild LLP

(57) ABSTRACT

Disclosed are an energy management method, system, computer device and readable storage medium. The method includes: obtaining a first current output power and a previous output power of a first energy supplier; obtaining a current power change rate of the first energy supplier according to the first current output power and the previous output power; obtaining a first reference power of the first energy supplier according to the first current output power, the previous output power and the current power change rate; obtaining a second current output power of a second energy supplier; obtaining a second reference power of the second energy supplier according to the first current output power, the second current output power and the first reference power; obtaining current flow rates of first and second gas and a current furnace temperature; and obtaining a reference flow rate of the first gas and a reference furnace temperature.

20 Claims, 9 Drawing Sheets

(51) Int. Cl.

| | |
|---|---|
| ***B60L 50/40*** | (2019.01) |
| ***B60L 50/75*** | (2019.01) |
| ***B60L 58/12*** | (2019.01) |
| ***H02J 7/00*** | (2026.01) |
| ***H02J 7/34*** | (2006.01) |

(52) U.S. Cl.
CPC .............. *B60L 58/12* (2019.02); *H02J 7/345* (2013.01); *H02J 7/855* (2026.01); *H02J 2207/50* (2020.01)

(58) Field of Classification Search
USPC ............................................................ 307/56
See application file for complete search history.

(56) References Cited

U.S. PATENT DOCUMENTS

| | | | |
|---|---|---|---|
| 6,453,693 | B1 | 9/2002 | Ewert et al. |
| 7,673,466 | B2 * | 3/2010 | Pacy .................. B60H 1/00014 62/239 |
| 7,878,013 | B2 | 2/2011 | Matsuno et al. |
| 11,374,246 | B2 | 6/2022 | Luo et al. |
| 12,252,037 | B2 * | 3/2025 | Yokoo ..................... B60L 50/51 |
| 2007/0052241 | A1 | 3/2007 | Pacy |
| 2008/0257622 | A1 * | 10/2008 | Teschner ................. B60L 50/40 180/65.29 |
| 2013/0000342 | A1 * | 1/2013 | Blasko ............... B60H 1/00428 62/235.1 |
| 2016/0297384 | A1 * | 10/2016 | Guo ...................... B60R 16/033 |
| 2020/0403258 | A1 | 12/2020 | Luo et al. |
| 2022/0305938 | A1 * | 9/2022 | Healy ..................... B60L 53/16 |
| 2023/0278651 | A1 | 9/2023 | Genter et al. |

FOREIGN PATENT DOCUMENTS

| | | | |
|---|---|---|---|
| CN | 203283004 | U | 11/2013 |
| CN | 104494545 | A | 4/2015 |
| CN | 106784943 | A | 5/2017 |
| CN | 106926713 | A | 7/2017 |
| CN | 109552112 | A | 4/2019 |
| CN | 109888415 | A | 6/2019 |
| CN | 210129554 | U | 3/2020 |
| CN | 111933973 | A | 11/2020 |
| CN | 112706682 | A | 4/2021 |
| CN | 114117964 | A | 3/2022 |
| CN | 114412668 | A | 4/2022 |
| CN | 115230437 | A | 10/2022 |
| CN | 114412668 | B | 2/2023 |
| CN | 116080481 | A | 5/2023 |
| EP | 1834818 | A2 | 9/2007 |
| EP | 2528759 | B1 | 11/2014 |
| EP | 3462109 | A1 | 4/2019 |
| JP | 2019054626 | A | 4/2019 |
| JP | 2024511509 | A | 3/2024 |
| JP | 2024515609 | A | 4/2024 |
| WO | 2021001717 | A1 | 1/2021 |

OTHER PUBLICATIONS

Zhai et al. "From lab to practical:An ammonia-powered fuel cell electric golf cart system," copyright Sep. 2022, Chemical Engineering Journal, 452, 139390, https://doi.org/10.1016/j.cej.2022.139390.

* cited by examiner

ENERGY MANAGEMENT METHOD, SYSTEM, COMPUTER DEVICE AND READABLE STORAGE MEDIUM

CROSS-REFERENCE TO RELATED APPLICATION

The present application is filed based upon and claims benefit of an International Application No. PCT/CN2023/133400 filed on Nov. 22, 2023, the entire contents of which are incorporated herein by reference.

TECHNICAL FIELD

The present disclosure relates to the field of hybrid energy storage, and in particular, to an energy management method, system, computer device and readable storage medium.

BACKGROUND

Proton exchange membrane fuel cells (PEMFCs) output electric power by supplying hydrogen and are currently applied to various vehicles or other generation devices. In order to improve the dynamic power and power density of the fuel cells, the fuel cells are usually used in combination with other energy storage component(s) (such as a supercapacitor, a lithium-ion battery, etc.) to ensure better performance in the vehicles or other generation devices.

SUMMARY

Embodiments of the present disclosure provide an energy management method, including: obtaining a first current output power and a previous output power of a first energy supplier; obtaining a current power change rate of the first energy supplier according to the first current output power and the previous output power; obtaining a first reference power of the first energy supplier according to the first current output power, the previous output power and the current power change rate; obtaining a second current output power of a second energy supplier; obtaining a second reference power of the second energy supplier according to the first current output power, the second current output power and the first reference power; obtaining a current flow rate of a first gas, a current flow rate of a second gas and a current furnace temperature; where the first energy supplier is connected to a gas conversion device, the first gas is converted into the second gas through the gas conversion device, the second gas is used for the first energy supplier to generate electricity, and the current furnace temperature is a current temperature of a furnace in the gas conversion device; and obtaining a reference flow rate of the first gas and a reference furnace temperature according to the current flow rate of the first gas, the current flow rate of the second gas, and the current furnace temperature.

An embodiment of the present disclosure also provides an energy management system, including an obtaining module and a processing module. The obtaining module is configured to obtain a first current output power and a previous output power of a first energy supplier, obtain a current flow rate of a first gas and a current furnace temperature, and obtain a current flow rate of a second gas; the processing module is configured to obtain a current power flow rate of the first energy supplier according to the first current output power and the previous output power; the processing module is further configured to obtain a first reference power of the first energy supplier according to the first current output power, the previous output power and the current power change rate; the obtaining module is further configured to obtain a second current output power of a second energy supplier; the processing module is further configured to obtain a second reference power of the second energy supplier according to the first current output power, the second current output power and the first reference power; the processing module is further configured to obtain a reference flow rate of the first gas and a reference furnace temperature according to the current flow rate of the first gas, the current furnace temperature and the current flow rate of the second gas.

An embodiment of the present disclosure also provides a computer device, including a processor, a memory, an input interface and an output interface; the processor is connected to the memory, the input interface and the output interface respectively, where the input interface and the output interface are configured to receive data and output data respectively, the memory is configured to store a computer program, and the processor is configured to call the computer program, so that the computer device executes the energy management method described in any of the above embodiments.

An embodiment of the present disclosure also provides a computer-readable storage medium that stores a computer program, and the computer program is adapted to be loaded and executed by a processor, so that a computer device having the processor executes the energy management method described in any of the above embodiments.

It can be seen from the above technical solutions that the energy management method of the embodiments of the present disclosure has at least one of the following advantages and positive effects.

In the embodiments of the present disclosure, the first reference power of the first energy supplier is obtained through the first current output power, the previous output power and the current power change rate, and the first reference power adapts to the power change rate of the first energy supplier, thus the operating efficiency and service life of the first energy supplier can be improved. The second reference power of the second energy supplier is obtained according to the first current output power, the second current output power and the first reference power, and the reference flow rate of the first gas and the reference furnace temperature are obtained through the current flow rate of the first gas, the current flow rate of the second gas and the current furnace temperature, thereby realizing the power allocation between the first energy supplier and the second energy supplier, optimizing the allocation of load power, and balancing the energy supply of the first energy supplier and the second energy supplier, moreover, the operation is efficient, the energy consumption is reduced and the service life of the two energy suppliers is extended.

BRIEF DESCRIPTION OF THE DRAWINGS

The above and other features and advantages of the present disclosure will become more apparent by describing in detail example embodiments thereof with reference to the accompanying drawings.

DETAILED DESCRIPTION

Figure 1:
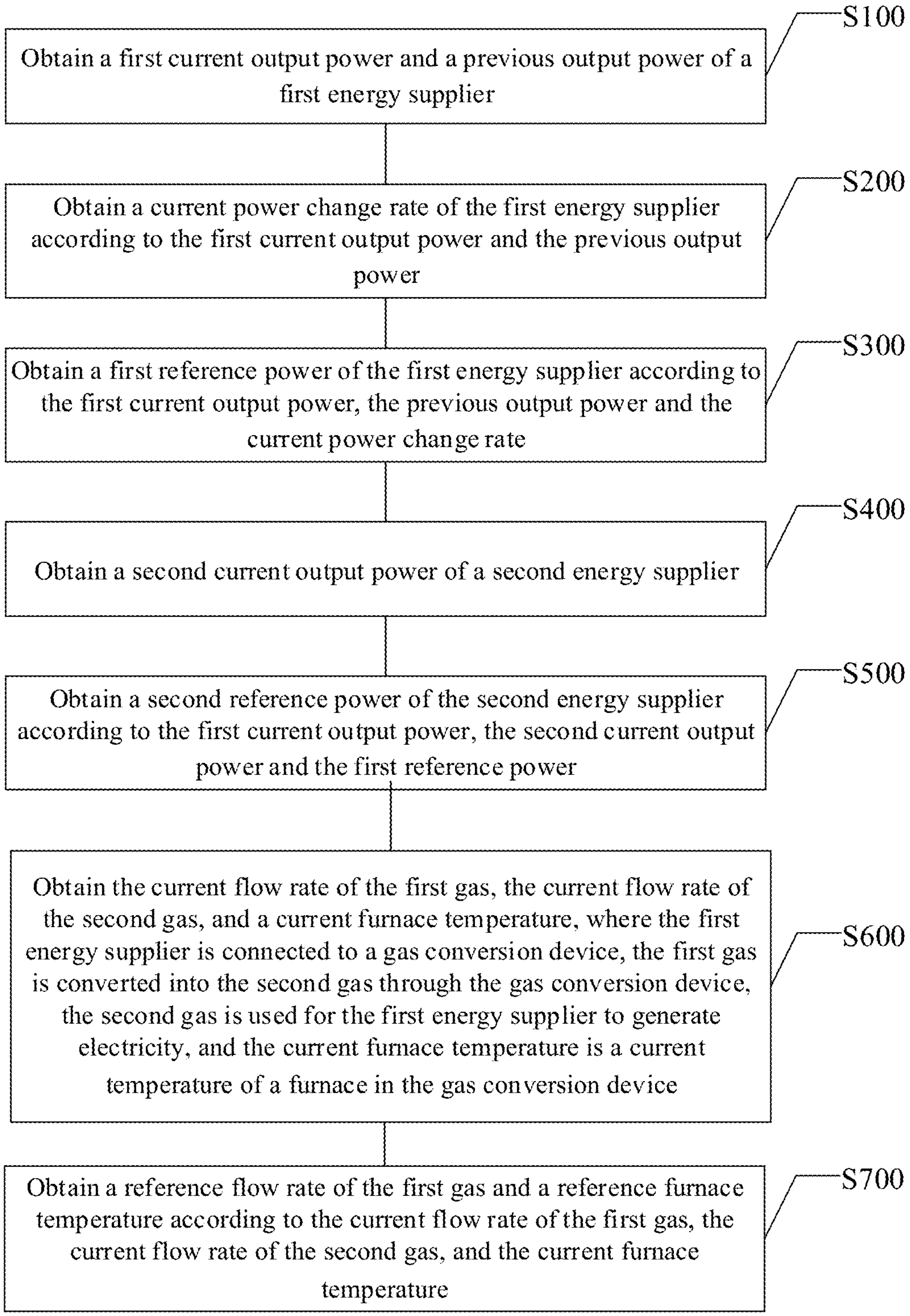
FIG. 1 is a flow chart of an energy management method according to some embodiments of the present disclosure.

The terms "first", "second", etc. in the present disclosure are used only as labels and are not numerical limitations to their objects. The flow charts shown in the drawings are only illustrative, and it is unnecessary to include all contents and operations/steps, nor must they be performed in the order described. For example, some operations/steps can be decomposed, and some operations/steps can be merged or partially merged, so the actual order of execution may change according to the actual situation.

During the use of fuel cells and other energy suppliers, there may be an imbalance in energy supply, which not only reduces the operating efficiency of the whole device, but also reduces the operating efficiency and service life of each energy supplier, and increases power consumption.

Figure 2:
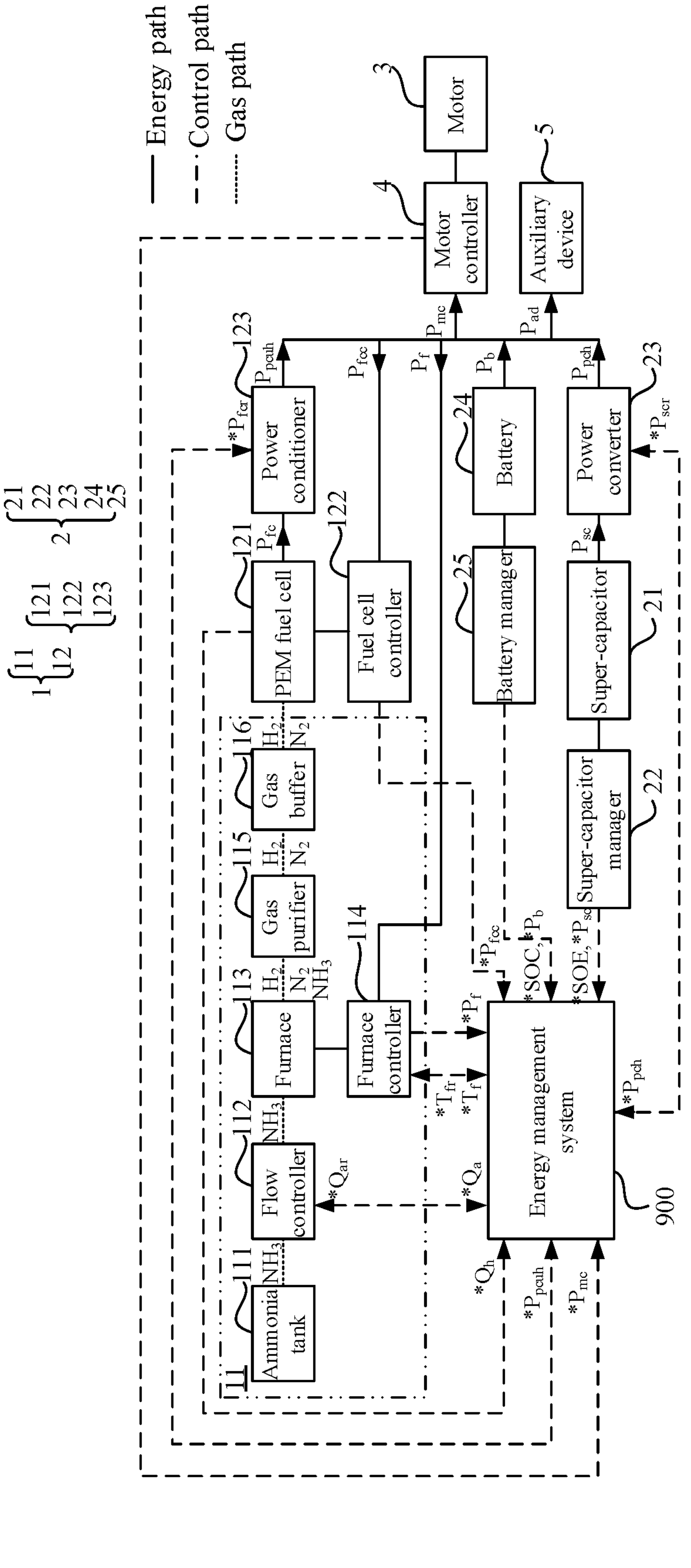
FIG. 2 is an energy conversion architecture diagram of an ammonia-powered proton exchange membrane fuel cell hybrid application according to some embodiments of the present disclosure.

As shown in FIG. 1, an embodiment of the present disclosure provides an energy management method, which can be applied to an ammonia-powered PEM fuel cell hybrid electric vehicle as shown in FIG. 2 to ensure the high-efficiency operation of the hybrid energy supply of the hybrid electric vehicle. The embodiments of the present disclosure take the PEM fuel cell hybrid electric vehicle as an example, but they are not limited thereto. The energy management method can also be applied to other hybrid electric equipment.

As shown in FIG. 2, the architecture of an ammonia-powered PEM fuel cell hybrid application may include a first energy supply device 1, a second energy supply device 2, a load, and an energy management system 900.

The first energy supply device 1 includes a gas conversion device 11 and a fuel cell device 12. The gas conversion device 11 may include an ammonia tank 111, a flow controller 112, a furnace 113, a furnace controller 114, a gas purifier 115 and a gas buffer 116. The fuel cell device 12 may include a PEM fuel cell 121, a fuel cell controller 122, and a power conditioner 123. The second energy supply device 2 may include a super-capacitor 21, a super-capacitor manager 22, a power converter 23, a battery 24 and a battery manager 25. The load may include a motor 3, a motor controller 4 and/or an auxiliary device 5.

The ammonia tank 111 is used to store ammonia ($NH_3$) and output the ammonia to the flow controller 112. The flow controller 112 is used to control the flow rate of ammonia, and can measure the flow rate $*Q_a$ of ammonia in real time and provide it to the energy management system 900, and receive an ammonia flow rate reference value $*Q_{ar}$ sent by the energy management system 900 to regulate the flow rate of ammonia, and output the regulated ammonia to the furnace 113. The furnace controller 114 is used to control the temperature of the furnace 113, so that the ammonia is split into hydrogen and nitrogen by the furnace 113, and hydrogen, nitrogen and a small amount of ammonia are output to the gas purifier 115. The furnace controller 114 can measure the furnace temperature $*T_f$ and input power $*P_f$ thereof in real time and send them to the energy management system 900, and receive the reference furnace temperature $*T_{fr}$ of the furnace 113 fed back by the energy management system 900, and the real-time input power of the furnace controller 114 is $P_f$. The gas purifier 115 removes ammonia from the mixed gas of hydrogen, nitrogen, and ammonia, and outputs the hydrogen and nitrogen to the gas buffer 116. The gas buffer 116 is used to maintain the stability of the gas flow and provide hydrogen and nitrogen to the PEM fuel cell 121.

The PEM fuel cell 121 is used to convert hydrogen into electric energy, and can measure the flow rate $*Q_h$ of hydrogen in real time, and send $*Q_h$ to the energy management system 900. The magnitude of the flow rate of the hydrogen is positively correlated with the electric energy generated by the PEM fuel cell 121. The fuel cell controller 122 is used to provide power to the auxiliary components in the PEM fuel cell 121 and send its own input power $*P_{fcc}$ measured in real time to the energy management system 900. The power conditioner 123 is used to adjust the output power of the PEM fuel cell 121, and send its own output power $*P_{pcuh}$ measured in real time to the energy management system 900, and receive the reference output power $*P_{fcr}$ of the power conditioner 123 sent by the energy management system 900.

The power converter 23 is used to adjust the output power $P_{sc}$ of the super-capacitor 21 and send the real-time measured high-side power $*P_{pch}$ of the power converter 23 to the energy management system 900, and receive the high-side power reference value $*P_{scr}$ of the power converter sent by the energy management system 900. The power converter 23 has a high-voltage side and a low-voltage side, and the high-side power refers to the power of the high-voltage side of the power converter 23. The super-capacitor manager 22 is used to monitor the operation of the super-capacitor 21 and provide real-time measured state of energy (*SOE) and output power $P_{sc}$ to the energy management system 900.

The battery manager 25 monitors the operation of the battery 24. The output power of the battery 24 is $P_b$. The battery manager 25 measures the output power $*P_b$ of the battery 24 in real time and the state of charge (*SOC), and sends $*P_b$ and *SOC to the energy management system 900. The battery 24 can automatically meet the power changes of the auxiliary device 5, and the input power of the auxiliary device 5 is represented by $P_{ad}$.

The motor controller 4 is used to adjust the output power of the motor 3. The input power of the motor controller 4 is $P_{mc}$. The motor controller 4 can measure its input power $*P_{mc}$ in real time and send it to the energy management system 900.

The PEM fuel cell 121, the super-capacitor 21 and the battery 24 are used to provide electric energy to the motor controller 4, the furnace controller 114, the fuel cell controller 122 and the auxiliary device 5, and the supercapacitor 21 and the battery 24 can absorb braking energy through the motor 3 and motor controller 4 (under braking). The super-capacitor 21 and the battery 24 can also receive the electric energy provided by the PEM fuel cell 121 to maintain the stable operation of the whole vehicle.

As shown in FIG. 1, the energy management method according to the embodiment of the present disclosure includes the following steps S100~S700.

In S100: a first current output power $^*P_{fc}(t_k)$ and a previous output power $^*P_{fc}(t_{k-1})$ of a first energy supplier are obtained.

Figure 3:
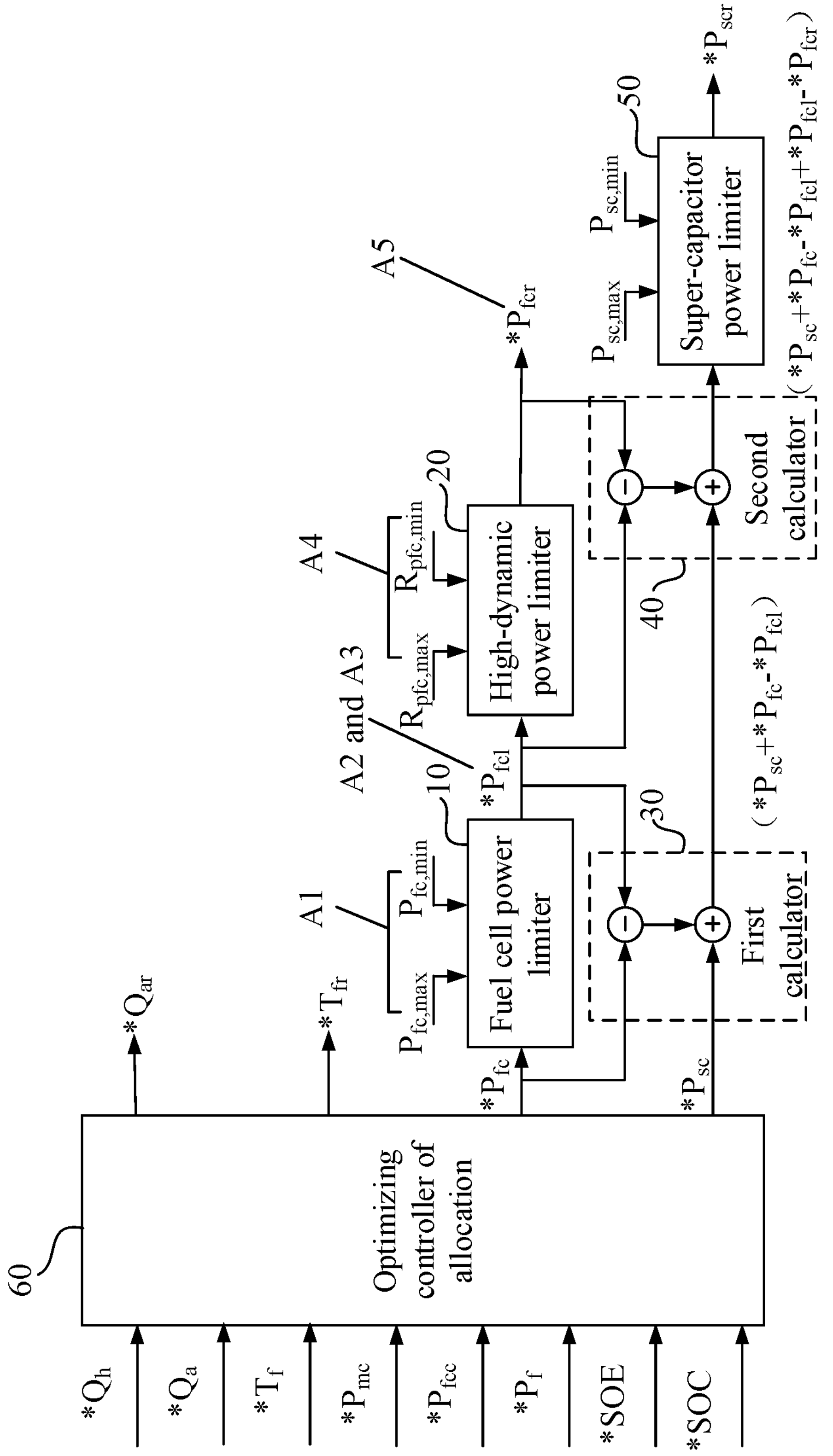
FIG. 3 is a control architecture diagram of an energy management method according to some embodiments of the present disclosure.

As shown in FIG. 3, the first current output power $^*P_{fc}(t_k)$ and the previous output power $^*P_{fc}(t_{k-1})$ are respectively the output power processed according to the load power and the state of the second energy supplier at a current moment $t_k$ and a previous moment $t_{k-1}$ of the first energy supplier, and are processed using the optimizing controller of allocation 60 shown in FIG. 3 (see Tables 1 to 5 below for specific processing procedures). For example, as shown in FIG. 3, the load power may be the real-time measured input power $^*P_{mc}$ of the motor controller 4, the real-time measured input power $^*P_{fcc}$ of the fuel cell controller 122 and the real-time measured input power $^*P_f$ of the furnace controller 114, the first energy supplier may be a PEM fuel cell 121, the second energy supplier may include a super-capacitor 21 and/or a battery 24, and the state of the second energy supplier may include the real-time measured state of energy *SOE of the super-capacitor 21 and/or the real-time measured state of charge *SOC of the battery. The state of energy (SOE) refers to the ratio of the current remaining energy (releasable energy) to the rated energy of the super-capacitor, indicating its remaining capacity. The state of charge (SOC) refers to the ratio of the current remaining charge to the rated charge of the battery, indicating its remaining capacity.

Among them, $t_k$ represents the current moment, $t_{k-1}$ represents the previous moment, k≥1 and is a positive integer.

In S200: a current power change rate $R_{pfc}(t_k)$ of the first energy supplier is obtained according to the first current output power $^*P_{fc}(t_k)$ and the previous output power $^*P_{fc}(t_{k-1})$.

$R_{pfc}(t_k)$ can be obtained according to the following formula (1):

$$R_{pfc}(t_k) = \frac{^*P_{fc}(t_k) - {}^*P_{fc}(t_{k-1})}{t_k - t_{k-1}} \tag{1}$$

In S300: a first reference power of the first energy supplier is obtained according to the first current output power $^*P_{fc}(t_k)$, the previous output power $^*P_{fc}(t_{k-1})$ and the current power change rate $R_{pfc}(t_k)$.

As shown in FIG. 3, S300 may include the following contents A1~A5.

In A1: a first preset power threshold of the first energy supplier is obtained.

As shown in FIG. 3, the first preset power threshold may include a first preset power maximum value $P_{fc,max}$ and a first preset power minimum value $P_{fc,min}$, that is, the first energy supplier normally operates between $P_{fc,min}$ and $P_{fc,max}$. The first preset power threshold can be set according to the actual operating conditions of the first energy supplier. For example, the first energy supplier may be a PEM fuel cell. When the rated power of the PEM fuel cell is 18 kW, $P_{fc,min}$=7 kW, and $P_{fc,max}$=20 kW. When the rated power of the PEM fuel cell is other values, $P_{fc,min}$ and $P_{fc,max}$ may also change. There are no special restrictions here.

In A2: a first current limited power $^*P_{fcl}(t_k)$ of the first energy supplier is obtained according to the first current output power $^*P_{fc}(t_k)$ and the first preset power threshold.

As shown in FIG. 3, since $^*P_{fc}(t_k)$ is an optimized value, it may not be within the first preset threshold range, and it needs to be limited to the first preset threshold range to ensure normal operation.

The first current limited power $^*P_{fcl}(t_k)$ is obtained according to the fuel cell power limiter 10. If $P_{fc,min} \le {}^*P_{fcl}(t_k) \le P_{fc,max}$, then $^*P_{fcl}(t_k) = {}^*P_{fc}(t_k)$; if $^*P_{fcl}(t_k) > P_{fc,max}$, then $^*P_{fcl}(t_k) = P_{fc,max}$; if $^*P_{fcl}(t_k)$ is less than $P_{fc,min}$, then $^*P_{fcl}(t_k) - P_{fc,min}$.

In A3: a previous limited power $^*P_{fcl}(t_{k-1})$ of the first energy supplier is obtained according to the previous output power $^*P_{fc}(t_{k-1})$ and the first preset power threshold.

As shown in FIG. 3, the previous limited power $^*P_{fcl}(t_{k-1})$ is obtained according to the fuel cell power limiter 10. If $P_{fc,min} \le {}^*P_{fcl}(t_{k-1}) \le P_{fc,max}$, then $^*P_{fcl}(t_{k-1}) = {}^*P_{fc}(t_{k-1})$; if $^*P_{fcl}(t_{k-1}) > P_{fc,max}$, then $^*P_{fcl}(t_{k-1}) = P_{fc,max}$; if $^*P_{fcl}(t_{k-1})$ is less than $P_{fc,min}$, then $^*P_{fcl}(t_{k-1}) = P_{fc,min}$.

In A4: a power change rate threshold of the first energy supplier is obtained.

In the embodiment of the present disclosure, the first energy supplier may include a PEM fuel cell 121 for providing low-dynamic power, and the second energy supplier may include a super-capacitor 21 for providing high-dynamic power. The dynamic power means that the amount of power changes over time. For example, when the change rate of the load power is large (such as a sudden increase in load power), this situation belongs to the high-dynamic power, and the second energy supplier is used preferentially to provide electric energy. When the change rate of the load power is small, that is, the load power is relatively stable, this situation belongs to the low-dynamic power, and the first energy supplier is used preferentially to provide electric energy.

That is to say, the change rate of the output power of the second energy supplier is greater than the change rate of the output power of the first energy supplier. The power change rate threshold of the first energy supplier includes the maximum power change rate $R_{pfc,max}$ and the minimum power change rate $R_{pfc,min}$. For example, when the rated power of the PEM fuel cell 121 is 30 kW, $R_{pfc,min}$ may be −4 kW/s, $R_{pfc,max}$ may be 4 kW/s. When the current power change rate $R_{pfc}(t_k)$ of the first energy supplier is between the maximum power change value and the minimum power change value, the output power of the first energy supplier is low-dynamic power. Referring to FIG. 2, the method of the present disclosure enables the PEM fuel cell 121 to provide low-dynamic load demand, the super-capacitor 21 to provide both high-dynamic load demand and low-dynamic load demand, and the battery 24 to provide both high-dynamic load demand and low-dynamic load demand. The change rate of the output power of the PEM fuel cell 121 is limited to a low-dynamic range of $R_{pfc,min}$~$R_{pfc,max}$, the power demand beyond this range is allocated to the super-capacitor 21, and the power demand beyond the limited power range of the super-capacitor 21 is allocated to the battery 24, so that each energy supplier can cooperate with each other under different load demand to improve operating efficiency.

In A5: the first reference power is obtained according to the first current limited power $^*P_{fcl}(t_k)$, the previous limited power $^*P_{fcl}(t_{k-1})$, the current power change rate $R_{pfc}(t_k)$ and the power change rate threshold.

In the embodiment of the present disclosure, A5 may include the following contents B1~B2.

In B1: according to the maximum power change rate $R_{pfc,max}$ and the minimum power change rate $R_{pfc,min}$, a maximum dynamic power variable $\Delta P_{fc,max}$ and a minimum dynamic power variable $\Delta P_{fc,min}$ of the first energy supplier are obtained.

In the embodiment of the present disclosure, $\Delta P_{fc,max}=R_{pfc,max}*(t_k-t_{k-1})$, $P_{fc,min}=R_{pfc,min}*(t_k-t_{k-1})$.

In B2: according to the current power change rate $R_{pfc}(t_k)$, the maximum power change rate $R_{pfc,max}$, the minimum power change rate $R_{pfc,min}$, the first current limited power $*P_{fcl}(t_k)$, the previous limited power $*P_{fcl}(t_{k-1})$, the maximum dynamic power variable $\Delta P_{fc,max}$ and the minimum dynamic power variable $\Delta P_{fc,min}$, the first reference power $*P_{fcr}$ is obtained.

In the embodiment of the present disclosure, in order to obtain the first reference power $*P_{fcr}$, B2 may include the following content.

As shown in FIG. 3, the high-dynamic power limiter 20 is used to obtain the first reference power $*P_{fcr}$. If $R_{pfc,min}\leq R_{pfc}(t_k)\leq R_{pfc,max}$, then $*P_{fcr}(t_k)=*P_{fc}(t_k)$; if $R_{pfc}(t_k)<R_{pfc,min}$, then $*P_{fcr}(t_k)=*P_{fcl}(t_{k-1})+\Delta P_{fc,min}$; if $R_{pfc}(t_k)>R_{pfc,max}$, then $*P_{fcr}(t_k)=*P_{fcl}(t_{k-1})+\Delta P_{fc,max}$.

It should be supplemented that $*P_{fcr}(t_k)$ is the first reference power obtained at the current moment, $*P_{fcl}(t_k)$ is the first current limited power, $*P_{fcl}(t_{k-1})$ is the previous limited power, and the others have the same meaning as above.

In S400: a second current output power $*P_{sc}(t_k)$ of a second energy supplier is obtained.

As shown in FIG. 3, the second current output power $*P_{sc}(t_k)$ is the output power after being processed according to the load power and the state of the second energy supplier (see Tables 1 to 5 below).

In the embodiment of the present disclosure, the first energy supplier may include a fuel cell (such as the PEM fuel cell 121), the second energy supplier may include a super-capacitor 21 and a battery 24, and the second current output power $*P_{sc}(t_k)$ is the current output power of the super-capacitor 21. Then obtaining the first current output power $*P_{fc}(t_k)$ of the first energy supplier and obtaining the second current output power $*P_{sc}(t_k)$ of the second energy supplier include: obtaining a current load power, a current state of energy of the super-capacitor 21 and a current state of charge of the battery 24; according to the current load power, the current state of energy and the current state of charge, obtaining the first current output power and the second current output power.

Specifically, in the embodiment of the present disclosure, an ammonia-powered PEM fuel cell 121 hybrid electric vehicle is taken as an example. The hybrid electric vehicle includes three modes. The first mode is an idle mode, that is, the motor 3 does not rotate, and the measured input power of the motor controller 4 $*P_{mc}=0$; the second mode is a driving mode, that is, the motor 3 rotates, and the measured input power of the motor controller 4 $*P_{mc}>0$; the third mode is a braking mode, in this mode, the motor controller 4 controls the rotor of the motor 3 to decelerate, and the motor 3 can feed back the braking energy to the super-capacitor 21 and the battery 24 through the motor controller 4, $*P_{mc}<0$. Referring to Tables 1 to 3, the first current output power $*P_{fc}(t_k)$ of the first power supplier and the second current output power $*P_{sc}(t_k)$ of the second power supplier are obtained according to the load power, the state of energy *SOE of the super-capacitor 21, and the state of charge *SOC of the battery 24.

TABLE 1

| $*P_{mc}=0$ (idle mode) | |
|---|---|
| Condition | Result |
| If *SOE =high & *SOC =high | $*P_{fc}=P_{fc,min}$, $*P_{sc}=*P_{ad}-*P_{fc}$ |
| If *SOE =medium & *SOC =high | $*P_{fc}=P_{fc,opt}$, $*P_{sc}=-(*P_{fc}-*P_{ad})$ |
| If *SOE =low & *SOC =high | If $(*P_{ad}-P_{sc,min})\leq P_{fc,max}$, then $*P_{sc}=P_{sc,min}$, $*P_{fc}=*P_{ad}-*P_{sc}$; otherwise, $*P_{fc}=P_{fc,max}$, $*P_{sc}=-(*P_{fc}-*P_{ad})$ |
| If *SOE =high & *SOC =medium | $*P_{fc}=P_{fc,opt}$, $*P_{sc}=0$ |
| If *SOE =medium & *SOC = medium | $*P_{fc}=P_{fc,opt}$, $*P_{sc}=0$ |
| If *SOE =low & *SOC =medium | $*P_{fc}=P_{fc,max}$, If $-(*P_{fc}-*P_{ad})\leq P_{sc,min}$, then $*P_{sc}=-(*P_{fc}-*P_{ad})$; otherwise, $*P_{sc}=P_{sc,min}$ |
| If *SOE =high & *SOC =low | $*P_{fc}=P_{fc,max}$, $*P_{sc}=0$ |
| If *SOE =medium & *SOC =low | $*P_{fc}=P_{fc,max}$, $*P_{sc}=0$ |
| If *SOE =low & *SOC =low | $*P_{fc}=P_{fc,max}$, $*P_{sc}=0$ |

Among them, $*P_{ad}=*P_{fcc}+*P_f$, that is, $*P_{ad}$ represents the sum of the real-time measured input power $*P_{fcc}$ of the fuel cell controller 122 and the real-time measured input power $*P_f$ of the furnace controller 114, which is the load power in the idle mode. *SOE has three states: high, medium and low, and *SOC also has three states: high, medium and low (the description at the bottom of Table 4 and Table 5 may be referred to). The negative sign indicates input or charging, for example, in $*P_{sc}=-(*P_{fc}-*P_{ad})$ in the second row of Table 1, the negative sign in front indicates the power allocated to the super-capacitor 21, that is, charging the super-capacitor 21.

For the sake of brevity, only part of the content in Table 1 is explained. In the first row, *SOE=high & *SOC=high, then the output power $*P_{fc}$ of the PEM fuel cell is $P_{fc,min}$, that is, the output power is the minimum. If the load power $*P_{ad}$ is greater than $*P_{fc}$, the output power $*P_{sc}$ of the super-capacitor 21 is adjusted to a difference between the two to discharge the super-capacitor 21. In the second row, *SOE=medium & *SOC=high, then the output power $*P_{fc}$ of the PEM fuel cell is adjusted to $P_{fc,opt}$. $P_{fc,opt}$ represents the output power of the fuel cell at its highest operating efficiency. At this time, $*P_{fc}$ is greater than the load power $*P_{ad}$, and the remaining power of the PEM fuel cell 121 is used to charge the super-capacitor 21, so $*P_{sc}=-(*P_{fc}-*P_{ad})$.

Figure 4:
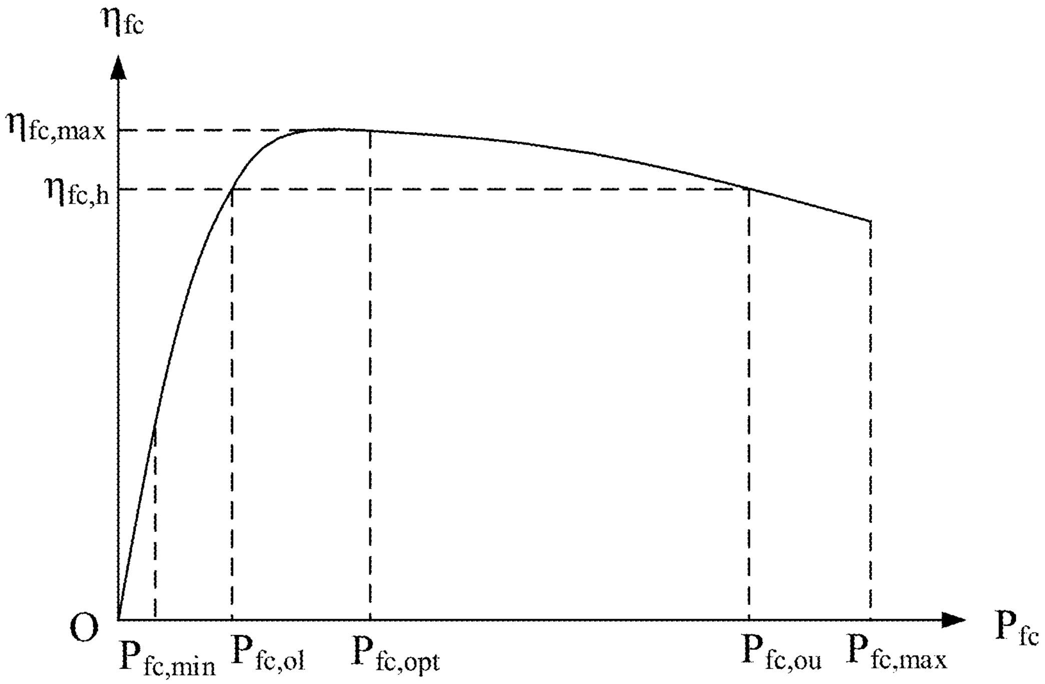
FIG. 4 is a schematic diagram showing a relationship between an output power and an operating efficiency of the PEM fuel cell according to some embodiments of the present disclosure.

As shown in FIG. 4, the abscissa represents the output power of the fuel cell, and the ordinate represents the operating efficiency of the fuel cell. When the output power is $P_{fc,opt}$, the operating efficiency is $\eta_{fc,max}$, which represents the highest operating efficiency. $\eta_{fc,h}$ represents the lower limit of high operating efficiency, which may be 90% of $\eta_{fc,max}$, for example. Depending on the load demand, the SOE of the super-capacitor 21 and the SOC of the battery, the output power of the PEM fuel cell 121 can be allocated to $[P_{fc,ol}, P_{fc,ou}]$, or $[P_{fc,min}, P_{fc,ol}]$, or $[P_{fc,ou}, P_{fc,max}]$, and the highest efficiency operation, the high efficiency operation and the operating efficiency as high as possible are obtained respectively.

In the fourth row of Table 1, *SOE=high & *SOC=medium, then the output power $*P_{fc}$ of the PEM fuel cell is adjusted to $P_{fc,opt}$, and the output power of the super-capacitor 21 $*P_{sc}=0$, then after providing power to the load, the remaining power of the PEM fuel cell charges the battery 24.

The electric power of the present disclosure is jointly provided by the PEM fuel cell 121, the super-capacitor 21 and the battery 24. If the output power of the PEM fuel cell 121 and the super-capacitor 21 (i.e., the output power adjusted by the power conditioner 123 and the power converter 23) changes, the output power of the battery 24 will automatically change to adapt to the new electrical power balance.

TABLE 2

| $*P_{mc} > 0$ (driving mode) | |
|---|---|
| Condition | Result |
| If *SOE =high & *SOC=high & $P_{fc,min} \le (*P_{mc}+*P_{ad}) \le P_{fc,max}$ | $P_{fc}=(*P_{mc}+*P_{ad})$, $*P_{sc}=0$ |
| If *SOE =high & *SOC =high & $P_{fc,max} < (*P_{mc}+*P_{ad})$ | $*P_{fc}=P_{fc,max}$; if $((*P_{mc}+*P_{ad})-*P_{fc}) \le P_{sc,max}$, then $P_{sc}=(*P_{mc}+*P_{ad})-*P_{fc}$; otherwise, $*P_{sc}=P_{sc,max}$ |
| If *SOE =medium & *SOC =high & $(*P_{mc}+*P_{ad}) < P_{fc,opt}$ | $*P_{fc}=P_{fc,opt}$, $*P_{sc}=-(*P_{fc}-(*P_{mc}+*P_{ad}))$ |
| If *SOE=medium & *SOC=high & $P_{fc,opt} \le (*P_{mc}+*P_{ad}) \le P_{fc,max}$ | $*P_{fc}=*P_{mc}+*P_{ad}$, $*P_{sc}=0$ |
| If *SOE =medium & *SOC =high & $P_{fc,max} < (*P_{mc}+*P_{ad})$ | $*P_{fc}=P_{fc,max}$, $*P_{sc}=0$ |
| If *SOE =low & *SOC =high & $(*P_{mc}+*P_{ad}) < P_{fc,max}$ | If $(*P_{mc}+*P_{ad}-P_{sc,min}) \le P_{fc,max}$, then $*P_{sc}=P_{sc,min}$, $*P_{fc}=*P_{mc}+*P_{ad}-*P_{sc}$; otherwise, $*P_{fc}=P_{fc,max}$, $*P_{sc}=-(*P_{fc}-(*P_{mc}+*P_{ad}))$ |
| If *SOE =low & *SOC =high & $P_{fc,max} \le (*P_{mc}+*P_{ad})$ | $*P_{fc}=P_{fc,max}$, $*P_{sc}=0$ |
| If *SOE =high & *SOC =medium & $(*P_{mc}+*P_{ad}) < P_{fc,opt}$ | $*P_{fc}=P_{fc,opt}$, $*P_{sc}=0$ |
| If *SOE = high & *SOC = medium & $P_{fc,opt} \le (*P_{mc}+*P_{ad}) \le P_{fc,max}$ | $*P_{fc}=(*P_{mc}+*P_{ad})$, $*P_{sc}=0$ |
| If *SOE=high & *SOC =medium & $P_{fc,max} < (*P_{mc}+*P_{ad})$ | $*P_{fc}=P_{fc,max}$; if $P_{sc,max} \ge (*P_{mc}+*P_{ad})-*P_{fc}$, then $*P_{sc}-(*P_{mc}+*P_{ad})-*P_{fc}$; otherwise, $*P_{sc}=P_{sc,max}$ |
| If *SOE =medium & *SOC=medium & $(*P_{mc}+*P_{ad}) < P_{fc,opt}$ | $*P_{fc}=P_{fc,opt}$; if $P_{sc,min} \le -(*P_{fc}-(*P_{mc}+*P_{ad}))$, then $*P_{sc}=-(*P_{fc}-(*P_{mc}+*P_{ad}))$; otherwise$*P_{sc}=P_{sc,min}$ |
| If *SOE =medium & *SOC=medium & $P_{fc,opt} \le (*P_{mc}+*P_{ad}) \le P_{fc,max}$ | $*P_{fc}=*P_{mc}+*P_{ad}$, $*P_{sc}=0$ |
| If *SOE =medium & *SOC =medium & $P_{fc,max} < (*P_{mc}+*P_{ad})$ | $*P_{fc}=P_{fc,max}$; if $P_{sc,max} \ge (*P_{mc}+*P_{ad})-*P_{fc}$, then $*P_{sc}=(*P_{mc}+*P_{ad})-*P_{fc}$; otherwise$*P_{sc}=P_{sc,max}$ |
| If *SOE =low & *SOC =medium & $(*P_{mc}+*P_{ad}) < P_{fc,max}$ | $*P_{fc}=P_{fc,max}$; if $P_{sc,min} \le -(*P_{fc}-(*P_{mc}+*P_{ad}))$, then $*P_{sc}=-(*P_{fc}-(*P_{mc}+*P_{ad}))$; otherwise$*P_{sc}=P_{sc,min}$ |
| If *SOE =low & *SOC=medium & $P_{fc,max} \le (*P_{mc}+*P_{ad})$ | $*P_{fc}=P_{fc,max}$, $*P_{sc}=0$ |
| If *SOE =high & *SOC =low & $(*P_{mc}+*P_{ad}) < P_{fc,max}$ | $*P_{fc}=P_{fc,max}$, $*P_{sc}=0$ |
| If *SOE =high& *SOC =low & $P_{fc,max} \le (*P_{mc}+*P_{ad})$ | $*P_{fc}=P_{fc,max}$; if $P_{sc,max} \ge (*P_{mc}+*P_{ad})-*P_{fc}$, then $*P_{sc}=(*P_{mc}+*P_{ad})-*P_{fc}$; otherwise$*P_{sc}=P_{sc,max}$ |
| If *SOE =medium & *SOC =low & $(*P_{mc}+*P_{ad}) < P_{fc,max}$ | $*P_{fc}=P_{fc,max}$, $*P_{sc}=0$ |
| If *SOE =medium & *SOC =low & $P_{fc,max} \le (*P_{mc}+*P_{ad})$ | $*P_{fc}=P_{fc,max}$; if $P_{sc,max} \ge (*P_{mc}+*P_{ad})-*P_{fc}$, then $*P_{sc}-(*P_{mc}+*P_{ad})-*P_{fc}$; otherwise$*P_{sc}=P_{sc,max}$ |
| If *SOE =low & *SOC =low | $*P_{fc}=P_{fc,max}$, $*P_{sc}=0$ |

In Table 2, $*P_{mc}+*P_{ad}$ represents the real-time measured load power in the driving mode. From the above content, it can be seen that $P_{fc,max}$ is the first preset power maximum value, that is, the maximum output power of the PEM fuel cell 121. $P_{fc,min}$ is the first preset power minimum value, that is, the minimum output power of the PEM fuel cell 121, which is used to maintain the idle operation of the PEM fuel cell 121.

For the sake of brevity, only part of the content in Table 2 is explained. In the first row, *SOE=high & *SOC=high & $P_{fc,min} \le (*P_{mc}+*P_{ad}) \le P_{fc,max}$, then the output power of the PEM fuel cell $*P_{fc}$ is $*P_{mc}+*P_{ad}$, and the output power of the super-capacitor $*P_{sc}$ is 0, that is, the load power is within the first preset power threshold range, and the load power is provided by the PEM fuel cell. After the PEM fuel cell provides power to the load, the remaining power is used to charge the battery 24.

In the fifth row, *SOE=medium & *SOC=high & $P_{fc,max} < (*P_{mc}+*P_{ad})$, then $P_{fc}=P_{fc,max}$, $*P_{sc}=0$, that is, the load power is greater than $P_{fc,max}$, and the output power of the PEM fuel cell is $P_{fc,max}$. If the output power of the PEM fuel cell still cannot meet the load power, the remaining load power is provided by the battery (because the *SOC of the battery is high and the *SOE of the super-capacitor is medium).

TABLE 3

| $*P_{mc} < 0$ (braking mode) | |
|---|---|
| Condition | Result |
| If *SOE =high & *SOC =high & $0 \le (*P_{mc}+*P_{ad}) \le P_{fc,min}$ | $*P_{fc}=P_{fc,min}$, $*P_{sc}=0$ |
| If *SOE =high & *SOC =high & $P_{fc,min} < (*P_{mc}+*P_{ad})$ | $*P_{fc}=(*P_{mc}+*P_{ad})$, $*P_{sc}=0$ |
| If *SOE =high & *SOC =high & $(*P_{mc}+*P_{ad}) < 0$ | $*P_{fc}=P_{fc,min}$, $*P_{sc}=0$ |
| If *SOE =medium & *SOC =high & $0 \le (*P_{mc}+*P_{ad}) < P_{fc,min}$ | $*P_{fc}=P_{fc,min}$, $*P_{sc}=-(*P_{fc}-(*P_{mc}+*P_{ad}))$ |
| If *SOE =medium & *SOC=high & $P_{fc,min} \le (*P_{mc}+*P_{ad}) < P_{fc,opt}$ | $*P_{fc}=P_{fc,min}$, $*P_{sc}=0$ |
| If *SOE=medium & *SOC=high & $P_{fc,opt} \le (*P_{mc}+*P_{ad}) < P_{fc,max}$ | $*P_{fc}=P_{fc,opt}$, $*P_{sc}=0$ |
| If *SOE =medium & *SOC=high & $(*P_{mc}+*P_{ad}) < 0$ | $*P_{fc}=P_{fc,min}$, if $P_{sc,min} \le (-*P_{fc}+(*P_{mc}+*P_{ad}))$, then $*P_{sc}=(*P_{mc}+*P_{ad})-*P_{fc}$; otherwise, $P_{sc}=P_{sc,min}$ |
| If *SOE =low & *SOC=high & $0 \le (*P_{mc}+*P_{ad})$ | $*P_{fc}=P_{fc,max}$; if $-*P_{fc}>P_{sc,min}$, then $*P_{sc}=-*P_{fc}$; otherwise, $*P_{sc}=P_{sc,min}$ |
| If *SOE=low & *SOC=high & $(*P_{mc}+*P_{ad}) < 0$ | If $P_{fc,min} \le ((*P_{mc}+*P_{ad})-P_{sc,min}) \le P_{fc,max}$, then $*P_{sc}=P_{sc,min}$, $*P_{fc}=(*P_{mc}+*P_{ad})-P_{sc,min}$; otherwise if $((*P_{mc}+*P_{ad})-P_{sc,min})<P_{fc,min}$, then $*P_{fc}=P_{fc,min}$, $*P_{sc}=P_{sc,min}$; otherwise if $((*P_{mc}+*P_{ad})-P_{sc,min})>P_{fc,max}$, then $*P_{fc}=P_{fc,max}$, $*P_{sc}=((*P_{mc}+*P_{ad})-*P_{fc}$ |
| If *SOE=high & *SOC=medium & $0 \le (*P_{mc}+*P_{ad}) < P_{fc,min}$ | $*P_{fc}=P_{fc,min}$, $*P_{sc}=0$ |
| If *SOE=high * & *SOC=medium & $P_{fc,min} \le (*P_{mc}+*P_{ad}) < P_{fc,opt}$ | $*P_{fc}=P_{fc,min}$, $*P_{sc}=*P_{mc}+*P_{ad}-*P_{fc}$ |
| If *SOE =high & *SOC=medium & $P_{fc,opt} \le (*P_{mc}+*P_{ad}) < P_{fc,max}$ | $*P_{fc}=P_{fc,opt}$, $*P_{sc}=*P_{mc}+*P_{ad}-*P_{fc}$ |
| If *SOE =high & *SOC =medium & $(*P_{mc}+*P_{ad}) < 0$ | $*P_{fc}=P_{fc,opt}$, $*P_{sc}=0$ |
| If *SOE =medium & *SOC=medium & $0 \le (*P_{mc}+*P_{ad}) < P_{fc,opt}$ | $*P_{fc}=P_{fc,opt}$, $*P_{sc}=-(*P_{fc}-(*P_{mc}+*P_{ad}))$ |
| If SOE =medium & *SOC=medium & $P_{fc,opt} \le (*P_{mc}+*P_{ad}) < P_{fc,max}$ | $*P_{fc}=*P_{mc}+*P_{ad}$, $*P_{sc}=0$ |
| If *SOE =medium & *SOC=medium & $(*P_{mc}+*P_{ad}) < 0$ | $*P_{fc}=P_{fc,opt}$, if $(-*P_{fc}+(*P_{mc}+*P_{ad})) \ge P_{sc,min}$, then $*P_{sc}=(*P_{mc}+*P_{ad})-*P_{fc}$; otherwise, $*P_{sc}=P_{sc,min}$ |
| If *SOE =low & *SOC =medium & $0 \le (*P_{mc}+*P_{ad})$ | $*P_{fc}=P_{fc,max}$ if $-(*P_{fc}-(*P_{mc}+*P_{ad})) \ge P_{sc,min}$, then $*P_{sc}=-(*P_{fc}-(*P_{mc}+*P_{ad}))$; otherwise, $P_{sc}=P_{sc,min}$ |
| If *SOE=low & *SOC=medium & $(*P_{mc}+*P_{ad}) < 0$ | If $P_{fc,min} \le ((*P_{mc}+*P_{ad})-P_{sc,min}) \le P_{fc,max}$, then $*P_{fc}=(*P_{mc}+*P_{ad})-P_{sc,min}$, $*P_{sc}=P_{sc,min}$; otherwise if $((*P_{mc}+*P_{ad})-P_{sc,min})<P_{fc,min}$, then $*P_{fc}=P_{fc,min}$, $*P_{sc}=P_{sc,min}$; otherwise if $((*P_{mc}+*P_{ad})-P_{sc,min})>P_{fc,max}$, then $*P_{fc}=P_{fc,max}$, $*P_{sc}=((*P_{mc}+*P_{ad})-*P_{fc}$ |
| If *SOE =high & *SOC =low & $(*P_{mc}+*P_{ad}) \ge 0$ | $*P_{fc}=P_{fc,max}$, $*P_{sc}=*P_{mc}+*P_{ad}$ |
| If *SOE =high & *SOC =low & $(*P_{mc}+*P_{ad}) <0$ | $*P_{fc}=P_{fc,max}$, $*P_{sc}=0$ |
| If *SOE =medium & *SOC =low & $(*P_{mc}+*P_{ad}) \ge 0$ | $*P_{fc}=P_{fc,max}$, $*P_{sc}=0$ |
| If *SOE =medium & *SOC =low & $(*P_{mc}+*P_{ad}) <0$ | $*P_{fc}=P_{fc,max}$, $*P_{sc}=0$ |
| If *SOE =low & *SOC =low | $*P_{fc}=P_{fc,max}$, $*P_{sc}=0$ |

Among them, ($*P_{mc}+*P_{ad}$)<0 means that under braking, the electric energy converted by the braking energy of the motor 3 through the motor controller 4 is greater than the electric energy required by the load, that is, the motor controller 4 is equivalent to an energy supply device at this time, as opposed to the output power of the motor controller 4.

In the first row, *SOE=high, *SOC=high, $0 \le (*P_{mc}+*P_{ad}) \le P_{fc,min}$, that is, the load power is positive and less than the first preset power minimum value, the output power of the PEM fuel cell 121 is adjusted to $P_{fc,min}$. At this time, the super-capacitor 21 does not need to be charged, so $*P_{sc}=0$, and the remaining power of the PEM fuel cell 121 charges the battery 24. Although the *SOC of the battery 24 is high, since the capacity of the battery 24 is larger, the remaining energy can be used to charge the battery 24.

In the fifth row from the bottom, *SOE=high & *SOC=low & ($*P_{mc}+*P_{ad}$)≥0, since *SOC is low, the output power $*P_{fc}$ of the PEM fuel cell is adjusted to $P_{fc,max}$, and the output power of the super-capacitor 21 is $*P_{mc}+*P_{ad}$, that is, the super-capacitor 21 provides electric energy to the load, and the PEM fuel cell charges the battery 24.

In the embodiment of the present disclosure, Table 4 is for the obtaining of the state of charge (SOC) of the battery 24, and Table 5 is for the obtaining of the state of energy (SOE) of the super-capacitor 21.

TABLE 4

Obtaining of the SOC of the battery

| Condition | Result |
|---|---|
| If $*SOC(t_k) > SOC_{max}$ | SOC = high |
| If $SOC_{nu} < *SOC(t_k) \le SOC_{max}$ & $*SOC(t_k) < *SOC(t_{k-1})$ | |
| If $SOC_{nl} \le *SOC(t_k) \le SOC_{nu}$ | SOC = medium |
| If $SOC_{min} \le *SOC(t_k) < SOC_{nl}$ & $*SOC(t_k) < *SOC(t_{k-1})$ | |
| If $SOC_{nu} < *SOC(t_k) \le SOC_{max}$ & $*SOC(t_k) > *SOC(t_{k-1})$ | |
| If $*SOC(t_k) < SOC_{min}$ | SOC = low |
| If $SOC_{min} \le *SOC(t_k) < SOC_{nl}$ & $*SOC(t_k) > *SOC(t_{k-1})$ | |
| If $*SOC(t_k) = *SOC(t_{k-1})$ | There is no change in level |

When the state of charge (SOC) of the battery 24 is medium, the *SOC is within [$SOC_{nl}$, $SOC_{nu}$], $SOC_{nl}$ represents the lower limit when the SOC is "medium", and $SOC_{nu}$ represents the upper limit when the SOC is "medium". When the *SOC is within [$SOC_{nl}$, $SOC_{nu}$], the battery 24 can be protected from aging or performance degradation, the battery 24 can be kept running efficiently, and the battery 24 can be charged or discharged. When the *SOC is within [$SOC_{min}$, $SOC_{nl}$], it means that the SOC is "low" and the battery needs to be charged. $SOC_{min}$ means the lower limit when the SOC is "low". When the *SOC is in within [$SOC_{nu}$, $SOC_{max}$], it means that the SOC is "high" and the battery needs to be discharged. $SO_{Cmax}$ means the upper limit when the SOC is "high". The values of $SOC_{min}$, $SOC_{nl}$, $SOC_{nu}$, and $SOC_{max}$ can be set according to the model of the battery 24. For example, when the battery 24 is a lithium-ion battery, $SOC_{min}$ may be 20%, $SOC_{nl}$ may be 55%, $SOC_{nu}$ may be 85%, and $SOC_{max}$ may be 100%, there are no special restrictions here.

TABLE 5

Obtaining of the SOE of the super-capacitor 21

| Condition | Result |
|---|---|
| If $*SOE(t_k) > SOE_{max}$ | SOE = high |
| If $SOE_{nu} < *SOE(t_k) \le SOE_{max}$ & $*SOE(t_k) < *SOE(t_{k-1})$ | |
| If $SOE_{nl} \le *SOE(t_k) \le SOE_{nu}$ | SOE = medium |
| If $SOE_{min} \le *SOE(t_k) < SOE_{nl}$ & $*SOE(t_k) < *SOE(t_{k-1})$ | |
| If $SOE_{nu} < *SOE(t_k) \le SOE_{max}$ & $*SOE(t_k) > *SOE(t_{k-1})$ | |
| If $*SOE(t_k) < SOE_{min}$ | SOE = low |
| If $SOE_{min} \le *SOE(t_k) < SOE_{nl}$ & $*SOE(t_k) > *SOE(t_{k-1})$ | |
| If $*SOE(t_k) = *SOE(t_{k-1})$ | There is no change in level |

Among them, when the state of energy (SOE) of the super-capacitor 21 is medium, the *SOE is within [$SOE_{nl}$, $SOE_{nu}$], that is, $SOE_{nl}$ represents the lower limit when the SOE is "medium", and $SOE_{nu}$ represents the upper limit when the SOE is "medium". When the *SOE is within [$SOE_{nl}$, $SOE_{nu}$], the super-capacitor 21 can be protected from aging or performance degradation, the super-capacitor 21 can be kept running efficiently, and the super-capacitor 21 can be charged or discharged. When *SOE is within [$SOE_{min}$, $SOE_{nl}$], it means that SOE is "low" and the super-capacitor 21 needs to be charged. $SOE_{min}$ means the lower limit when SOE is "low". When *SOE is within [$SOE_{nu}$, $SOE_{max}$], it means that SOE is "high" and the super-capacitor 21 needs to be discharged. $SOE_{max}$ means the upper limit when SOE is "high". The values of $SOE_{min}$, $SOE_{nl}$, $SOE_{nu}$, and $SOE_{max}$ can be set according to the model of the super-capacitor 21. For example, when the super-capacitor 21 is an electric double layer capacitor (EDLC), $SOE_{min}$ may be 30%, $SOE_{nl}$ may be 45%, $SOE_{nu}$ may be 90%, $SOE_{max}$ may be 100%, there is no special restrictions here.

The conditions in Table 4 and Table 5 can be determined according to the hysteresis control algorithm to make SOC/SOE change smoothly, which can be obtained by those skilled in the art according to the related art, and will not be described again here.

In S500: a second reference power $*P_{scr}(t_k)$ of the second energy supplier is obtained according to the first current output power $*P_{fc}(t_k)$, the second current output power $P_{sc}(t_k)$ and the first reference power $*P_{fcr}(t_k)$.

In the embodiment of the present disclosure, S500 may include: obtaining a second preset power threshold of the second energy supplier; obtaining the second reference power $*P_{scr}(t_k)$ according to the first current output power $*P_{fc}(t_k)$, the second current output power $*P_{sc}(t_k)$, the first reference Power $*P_{fcr}(t_k)$ and the second preset power threshold.

As shown in FIG. 3, the load power and the *SOE of the super-capacitor 21 and the *SOC of the battery 24 are measured in real time, and the optimizing controller of allocation 60 is used to obtain the first current output power $*P_{fc}(t_k)$ according to the above table and obtain the first current limited power $*P_{fcl}(t_k)$. If $*P_{fc}(t_k)$ is not equal to $*P_{fcl}(t_k)$, the first calculator 30 in FIG. 3 is used to calculate a difference between $*P_{fc}(t_k)$ and $*P_{fcl}(t_k)$, and the difference and the second current output power $*P_{sc}(t_k)$ of the second energy supplier are summed, that is, $*P_{sc}(t_k)+*P_{fc}(t_k)-*P_{fcl}(t_k)$, and the remaining power of the first energy supplier (PEM fuel cell 121) is allocated to the second energy supplier (super-capacitor 21).

After obtaining the first reference power $*P_{fcr}(t_k)$ using the high-dynamic power limiter 20, if $*P_{fcr}(t_k)$ is not equal to $*P_{fcl}(t_k)$, the second calculator 40 is used to calculate a difference between $*P_{fcl}(t_k)$ and $*P_{fcr}(t_k)$, and the difference and $*P_{sc}(t_k)+*P_{fc}(t_k)-*P_{fcl}(t_k)$ are summed to obtain the output power of the second energy supplier after allocation, that is, $*P_{sc}(t_k)+*P_{fc}(t_k)-*P_{fcl}(t_k)+*P_{fcl}(t_k)-*P_{fcr}(t_k)=*P_{sc}(t_k)+*P_{fc}(t_k)-*P_{fcr}(t_k)$.

The second preset power threshold of the second energy supplier is obtained. The second preset power threshold may include a second preset power maximum value $P_{sc,max}$ and a second preset power minimum value $P_{sc,min}$, that is, the second energy supplier operates normally when the output power is between $P_{sc,max}$ and $P_{sc,min}$.

As shown in FIG. 3, the super-capacitor limiter 50 is used to obtain the current second reference power $*P_{scr}(t_k)$. Specifically, after obtaining the output power $*P_{sc}(t_k)+*P_{fc}(t_k)-*P_{fcr}(t_k)$ of the second energy supplier after allocation, if $P_{sc,min}\leq *P_{sc}(t_k)+*P_{fc}(t_k)-*P_{fcr}(t_k)\leq P_{sc,max}$, then $*P_{scr}(t_k)=*P_{sc}(t_k)+*P_{fc}(t_k)-*P_{fcr}(t_k)$; if $*P_{sc}(t_k)+*P_{fc}(t_k)-*P_{fcr}(t_k)> P_{sc,max}$, then $*P_{scr}(t_k)=P_{sc,max}$; if $*P_{sc}(t_k)+*P_{fc}(t_k)-*P_{fcr}(t_k)<P_{sc,min}$, then $*P_{scr}(t_k)=P_{sc,min}$.

Through the above management, the first energy supplier maintains high-efficiency operation in the low-dynamic power range, and the remaining power of the first energy supplier is allocated to the second energy supplier, so that the second energy supplier operates within the normal range, for example, the SOE of the super-capacitor 21 and the SOC of the battery 24 are kept within a normal range, thereby avoiding aging or performance degradation of the super-capacitor 21 and the battery 24, and maintaining high-efficiency operation. Furthermore, the second energy supplier is able to operate efficiently in a high-dynamic power range.

After obtaining the first reference power and the second reference power, the energy management system 900 may feed back the first reference power to the power conditioner 123 and feed back the second reference power to the power converter 23, so that they can output the specified power respectively.

In S600: the current flow rate $*Q_a$ of the first gas, the current flow rate $*Q_h$ of the second gas, and the current furnace temperature $*T_f$ are obtained.

In the embodiment of the present disclosure, referring to FIG. 2, the gas conversion device 11 is connected to the first energy supplier (PEM fuel cell). The gas conversion device 11 is used to convert the first gas into the second gas, and the second gas is used for the fuel cell 121 to generate electricity. As shown in FIG. 2, the current furnace temperature $*T_f$ is the current temperature of the furnace 113 in the gas conversion device 11 and is measured by the furnace controller 114. As shown in FIG. 3, $*Q_a$ is the ammonia flow rate measured in real time, and $*Q_h$ is the hydrogen flow rate measured in real time. The first gas may be ammonia, and the second gas may be hydrogen.

In S700: according to the current flow rate $*Q_a$ of the first gas, the current flow rate $*Q_h$ of the second gas, and the current furnace temperature $*T_f$, the reference flow rate $*Q_{ar}$ of the first gas and the reference furnace temperature $*T_{fr}$ are obtained.

S700 is designed to keep the flow rate $Q_h$ of the second gas (hydrogen) stable and reduce the furnace temperature as much as possible to save energy consumption. S700 may include the following contents C1~C3.

In C1: if the current furnace temperature $*T_f$ minus one preset furnace temperature step size $H_t$ is greater than the minimum preset furnace temperature $T_{fl}$, the current flow rate $*Q_a$ of the first gas is regulated to $*Q_{ar}$ to maintain the current flow rate of the second gas to be stable; if the regulated flow rate $*Q_{ar}$ of the first gas is within a preset range, the furnace temperature is continuously reduced according to the preset furnace temperature step size to no less than the minimum preset furnace temperature, and the flow rate $*Q_{ar}$ of the first gas is continued to be regulated to maintain the current flow rate $*Q_h$ of the second gas to be stable.

Figure 5:
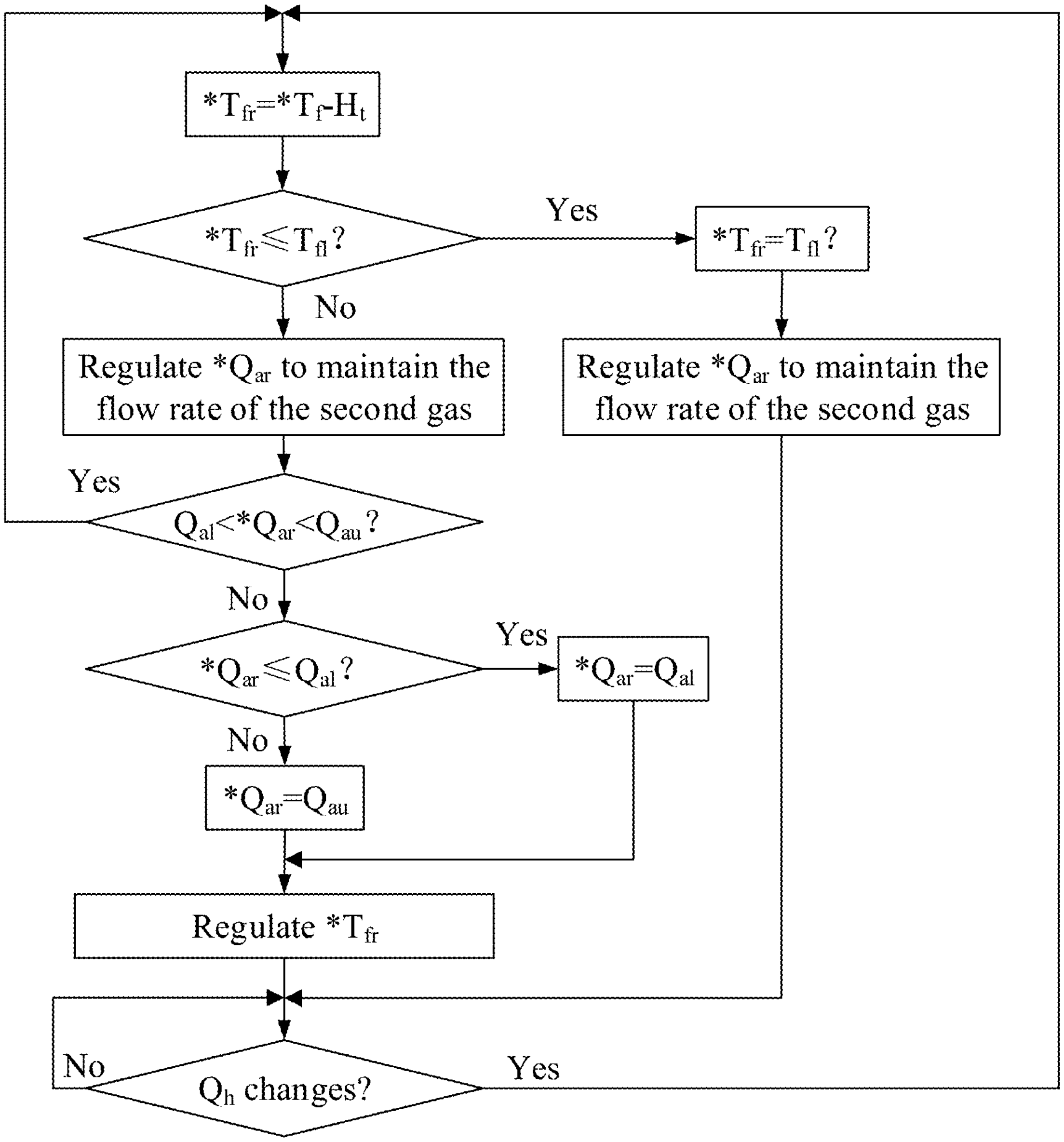
FIG. 5 is a flow chart of regulating a furnace temperature, an ammonia flow rate and a hydrogen flow rate according to some embodiments of the present disclosure.
Figure 6:
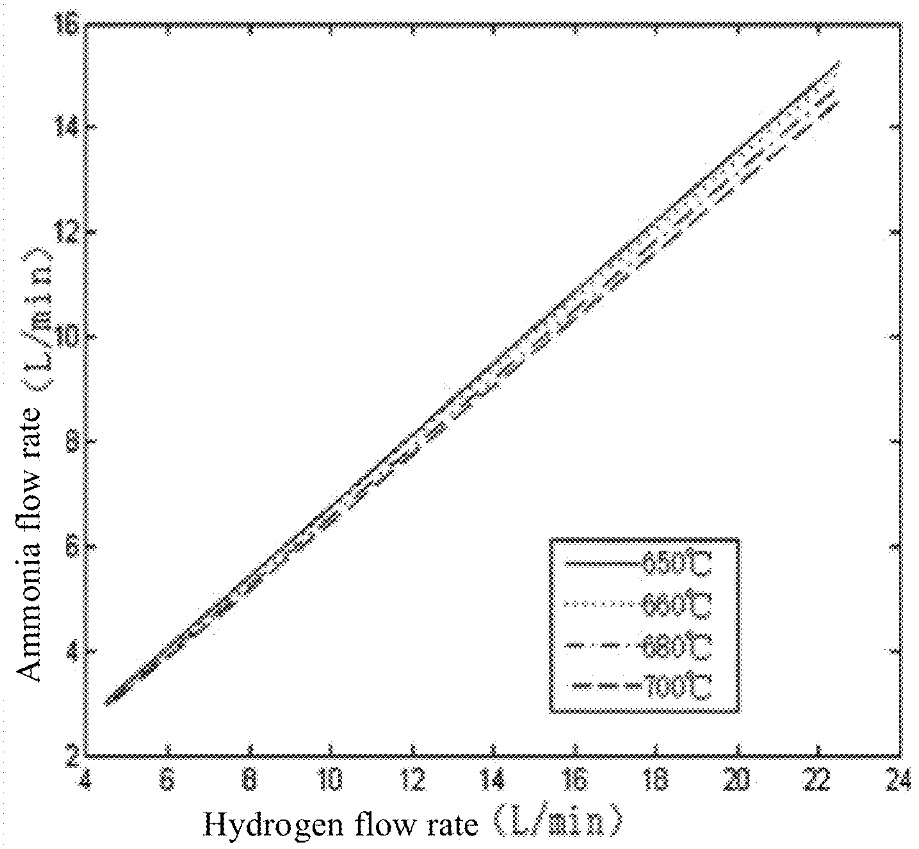
FIG. 6 is a schematic diagram showing a relationship among the ammonia gas, the hydrogen gas and a furnace temperature according to some embodiments of the present disclosure.

As shown in FIG. 5, the minimum preset furnace temperature $T_{fl}$ is the lower limit of the temperature at which the second gas (hydrogen) can be normally produced. The preset range of the flow rate of the first gas is $[Q_{al}, Q_{au}]$, the preset furnace temperature step size is $H_t$, and $H_t$ may be 0.5° C. Referring to FIG. 6, a schematic diagram of the relationship among ammonia, hydrogen and the furnace temperature is shown. From this, it can be seen that the hydrogen flow rate increases as the ammonia flow rate increases, and the hydrogen flow rate increases as the furnace temperature increases. The flow rate of the first gas (ammonia) can be adjusted according to FIG. 6 to maintain the current flow rate of the second gas (hydrogen). For example, the flow rate can be increased or decreased by at least one flow rate step size.

In C2: if the current furnace temperature $*T_f$ minus one preset furnace temperature step size $H_t$ or multiple preset furnace temperature step sizes is greater than the minimum preset furnace temperature $T_{fl}$, and the regulated flow rate of the first gas is outside the preset range, then the flow rate of the first gas is regulated to the maximum flow rate or the minimum flow rate to obtain the reference flow rate $*Q_{ar}$ of the first gas, and the furnace temperature is regulated to obtain the reference furnace temperature $*T_{fr}$ to maintain the flow rate of the second gas to be stable. It should be noted that since the reference flow rate $*Q_{ar}$ is also the flow rate after the first gas is regulated, it is also expressed as $*Q_{ar}$.

As shown in FIG. 5, in this case, $*T_f-H_t>T_{fl}$, $*Q_{ar}\leq Q_{al}$, or $*Q_{ar}\geq Q_{au}$, if $*Q_{ar}\leq Q_{al}$, then it is regulated to $*Q_{ar}=Q_{al}$, if $*Q_{ar}\geq Q_{au}$, then it is regulated to $*Q_{ar}=Q_{au}$ (that is, if $*Q_{ar}$ is not within the preset range, then $*Q_{ar}$ is regulated to the upper limit or lower limit of the range), and $*Q_{ar}$ at this time is the obtained reference flow rate of the first gas. At this time, $*Q_{ar}$ cannot be further adjusted, thus the hydrogen flow rate can only be kept stable by adjusting the furnace temperature. The final furnace temperature obtained is the reference furnace temperature $*T_{fr}$.

Referring to FIG. 6, according to the measured value of hydrogen flow rate $*Q_h$, the furnace temperature is adjusted to keep it stable. For example, if the hydrogen flow rate $*Q_h$ is 12 L/min and $*Q_a$ is 8 L/min (assumed to be the upper limit value or lower limit value), the furnace temperature to keep the hydrogen flow rate stable should be 680° C., while the actual furnace temperature is 700° C., then it only needs to adjust the furnace temperature to 680° C. The adjustment can be made based on the corresponding relationship among the three in FIG. 6 as a reference. The above example is only for the convenience of illustrating how to adjust according to FIG. 6, and the specific values should be selected according to the actual situation.

In C3: if the current furnace temperature $*T_f$ minus one preset furnace temperature step size $H_t$ or multiple preset furnace temperature step sizes is less than or equal to the minimum preset furnace temperature $T_{fl}$, the reduced furnace temperature is regulated to the minimum preset furnace temperature to obtain the reference furnace temperature, and the flow rate $*Q_{ar}$ of the first gas is regulated to obtain the reference flow rate $*Q_{ar}$ of the first gas and maintain the current flow rate $*Q_h$ of the second gas to be stable.

As shown in FIG. 5, in this case, $*T_{fr}=*T_f-H_t\leq T_{fl}$, that is, the regulated furnace temperature $*T_{fr}$ is less than or equal to the minimum preset furnace temperature $T_{fl}$, then the regulated furnace temperature is adjusted to the minimum preset furnace temperature $T_{fl}$, and the minimum preset furnace temperature $T_{fl}$ at this time is the reference furnace temperature $*T_{fr}$. Since the furnace temperature cannot be further adjusted at this time, the hydrogen flow rate $*Q_h$ can only be kept stable by adjusting the ammonia flow rate $*Q_{ar}$. The ammonia flow rate obtained at this time is the reference flow rate $*Q_{ar}$ of the first gas. It should be noted that since the reference furnace temperature $*T_{fr}$ is also the furnace temperature after regulation, it is also expressed as $*T_{fr}$.

Continuing to refer to FIG. 6, for example, the hydrogen flow rate $*Q_h$ is 12 L/min, and the reference furnace temperature $*T_{fr}$ is 680° C. (assumed to be the lower limit), then the ammonia flow rate $*Q_h$ to keep the hydrogen flow rate stable should be 8 L/min, but in fact the ammonia flow rate is 10 L/min, then the ammonia flow rate can be adjusted to 8 L/min. The adjustment can be made based on the corresponding relationship among the three in FIG. 6 as a reference. The above example is only for the convenience of illustrating how to adjust according to FIG. 6, and the specific values should be selected according to the actual situation.

After the above adjustments, if the hydrogen flow rate still changes, the above adjustments are continued until the hydrogen flow rate is stable.

In the embodiment of the present disclosure, after using the energy management method to obtain the first reference power $*P_{fcr}$ of the first energy supplier (PEM fuel cell 121), the hydrogen flow rate and the ammonia flow rate corresponding to $*P_{fcr}$ can be obtained. In order to keep the hydrogen flow rate stable at this moment to maintain $*P_{fcr}$, the ammonia flow rate and the furnace temperature are adjusted according to the above contents of C1~C3, and the ammonia flow rate reference value $*Q_{ar}$ and the reference furnace temperature $*T_{fr}$ corresponding to $*P_{fcr}$ are output to adjust the ammonia flow rate and the furnace temperature to the corresponding reference values. When the value of $*P_{fcr}$ changes, the corresponding hydrogen flow rate also changes, and the ammonia flow rate and the furnace temperature are adjusted according to the above contents of C1~C3. Therefore, the whole hybrid function architecture is adjusted in real time to ensure high-efficiency operation.

The above adjustment can optimize the ammonia flow rate and keep the furnace temperature to the lowest, and maximize the operating efficiency of the gas conversion device 11, so that the gas conversion device 11 can provide stable hydrogen for the PEM fuel cell 121 in the fuel cell device 12, and thus the operation of the PEM fuel cell 121 is more efficient and stable.

It should be noted that if $*T_f \leq T_{fl}$, that is, the furnace temperature $*T_f$ measured in real time (it is not reduced) is less than or equal to the minimum preset furnace temperature, then the furnace temperature $*T_f$ may be regulated to the minimum preset furnace temperature, and then the ammonia flow rate is adjusted to keep the hydrogen flow rate stable.

Figure 7:
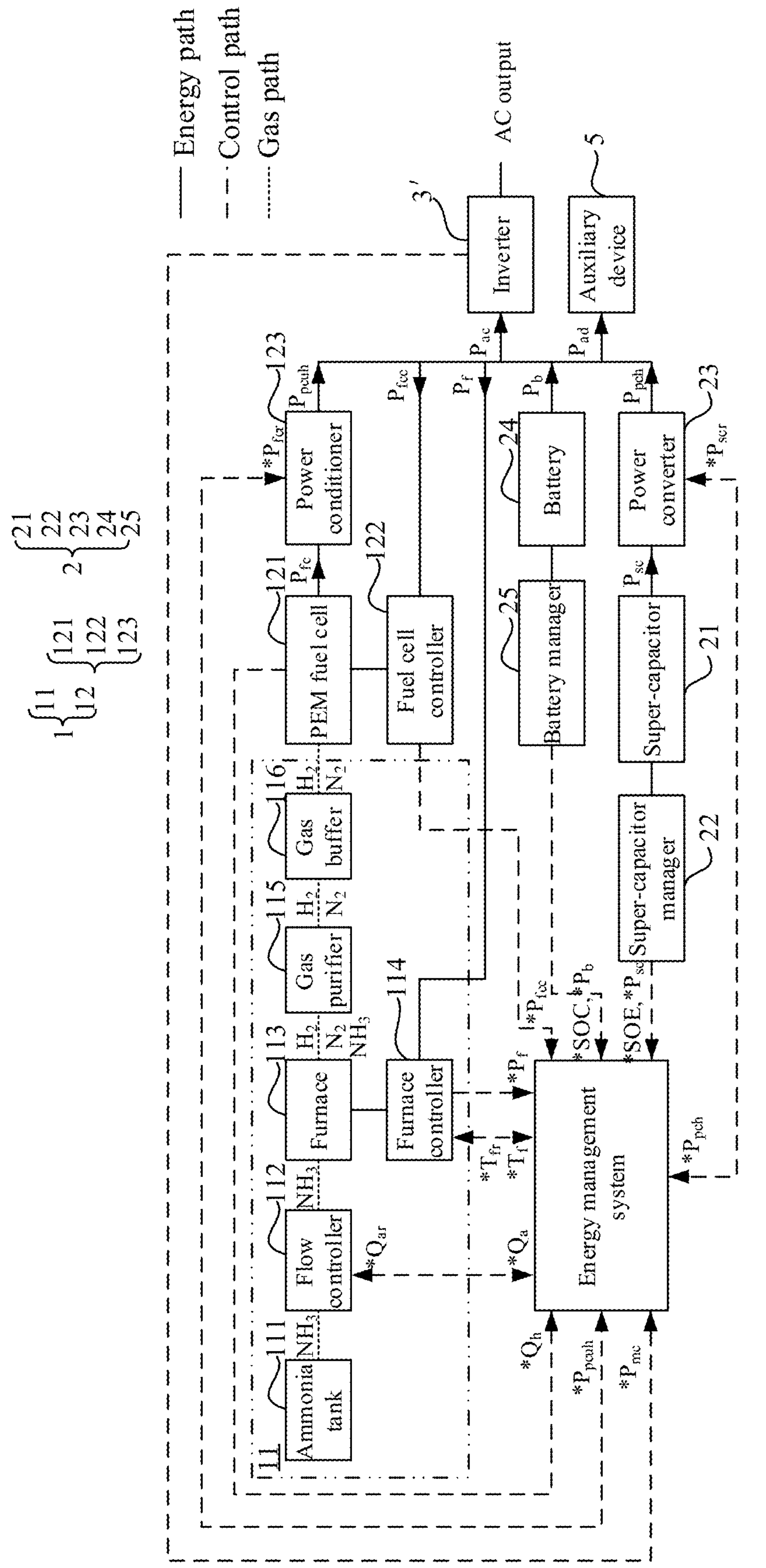
FIG. 7 is an energy conversion architecture diagram of an ammonia-powered proton exchange membrane fuel cell hybrid application according to other embodiments of the present disclosure.
Figure 8:
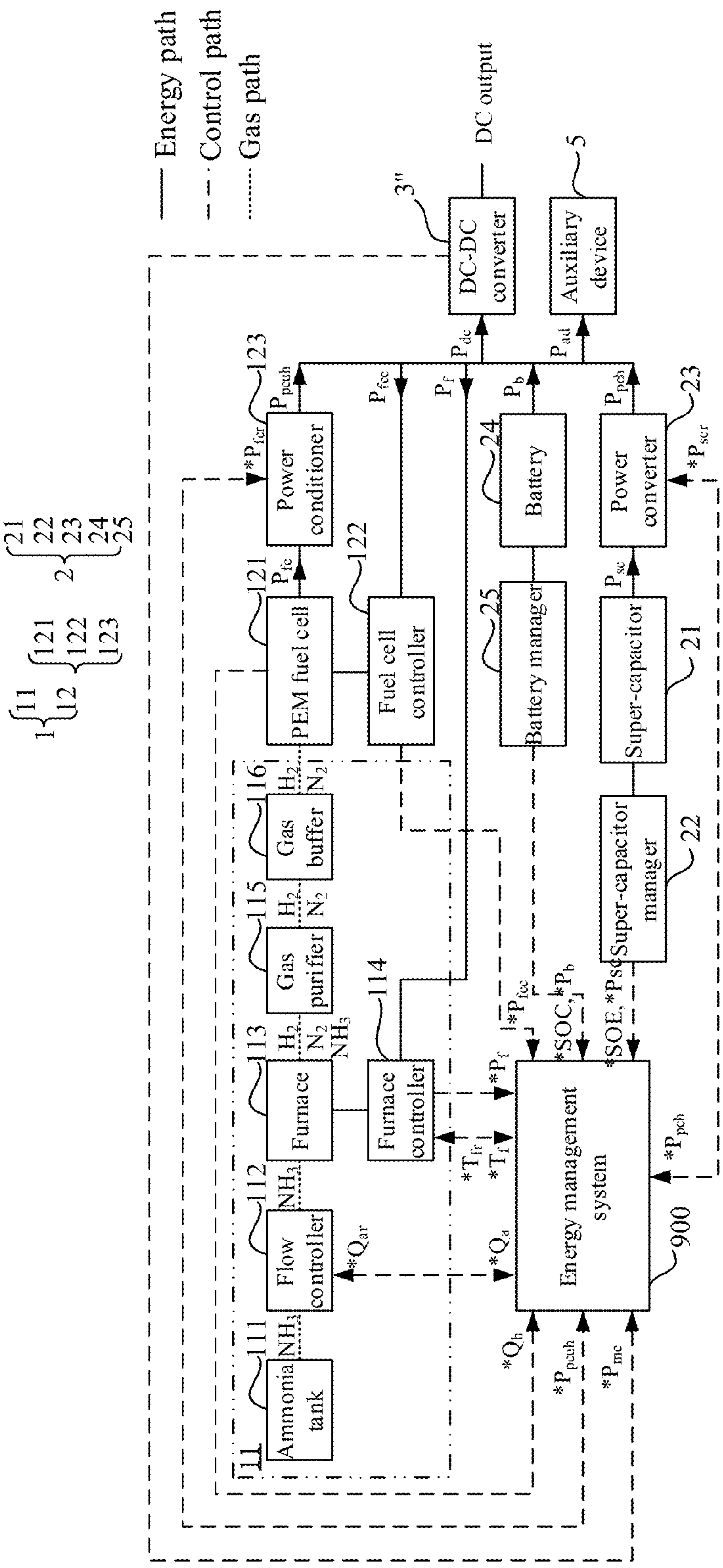
FIG. 8 is an energy conversion architecture diagram of an ammonia-powered proton exchange membrane fuel cell hybrid application according to other embodiments of the present disclosure.
Figure 9:
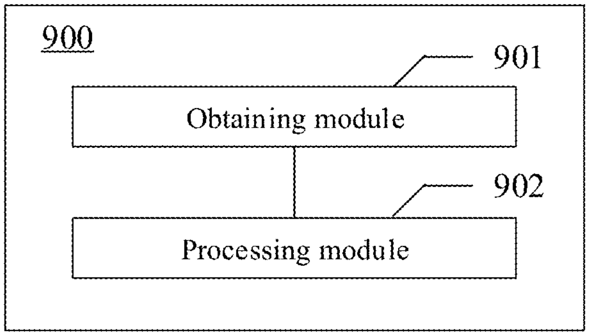
FIG. 9 is a block diagram of an energy management system according to some embodiments of the present disclosure.

As shown in FIGS. 7 and 8, which are energy conversion architecture diagrams of ammonia-powered proton exchange membrane fuel cell hybrid applications shown in other embodiments of the present disclosure, the difference from FIG. 2 is that in FIG. 2, the motor controller 4 is used and power is output to the motor 3, while in FIG. 7, an inverter 3' is used and AC power is output, and in FIG. 8, a DC-DC converter 3" is used and DC power is output. The energy management method of the embodiments of the present disclosure is suitable for the hybrid applications in FIGS. 7 and 8.

An embodiment of the present disclosure also provides an energy management system 900, including an obtaining module 901 and a processing module 902. The obtaining module 901 is configured to obtain a first current output power and a previous output power of a first energy supplier. The processing module 902 is configured to obtain a current power change rate of the first energy supplier according to the first current output power and the previous output power. The processing module 902 is also configured to obtain a first reference power of the first energy supplier according to the first current output power, the previous output power and the current power change rate. The obtaining module 901 is also configured to obtain a second current output power of a second energy supplier. The processing module 902 is also configured to obtain a second reference power of the second energy supplier according to the first current output power, the second current output power and the first reference power. The obtaining module 901 is also configured to obtain a current flow rate of a first gas, a current flow rate of a second gas, and a current furnace temperature, where the first energy supplier is connected to a gas conversion device, the first gas is converted into the second gas by the gas conversion device, the second gas is used for the first energy supplier to generate electricity, and the current furnace temperature is the current temperature of a furnace in the gas conversion device. The processing module 902 is also configured to obtain a reference flow rate of the first gas and a reference furnace temperature according to the current flow rate of the first gas, the current flow rate of the second gas and the current furnace temperature.

In the embodiment of the present disclosure, the processing module 902 may include an optimizing controller of allocation 60, a fuel cell power limiter 10 and a high-dynamic power limiter 20 as shown in FIG. 3.

Embodiments of the present disclosure also provide a computer device, including a processor, a memory, an input interface and an output interface; the processor is connected to the memory, the input interface and the output interface respectively, where the input interface and the output interface are used to receive data and output data respectively, the memory is used to store a computer program, and the processor is used to call the computer program, so that the computer device executes the energy management methods in any of the above embodiments.

Embodiments of the present disclosure also provide a computer-readable storage medium. The computer-readable storage medium stores a computer program. The computer program is adapted to be loaded and executed by a processor, so that a computer device having the processor executes the energy management methods in any of the above embodiments.

The computer device and the computer-readable storage medium of the embodiments of the present disclosure, by executing the above energy management methods, allocate the load power between the first energy supplier and the second energy supplier optimally, so that the first energy supplier and the second energy supplier operate efficiently, thereby enabling the whole electrical equipment to operate efficiently, while avoiding performance degradation of the first energy supplier and the second energy supplier, and prolonging the service life of the first energy supplier and the second energy supplier.

It should be understood that the present disclosure is not limited in its application to the detailed structure and arrangement of components set forth in this specification. The present disclosure may have other implementations and may be implemented and carried out in various ways. The aforementioned variations and modifications fall within the scope of the present disclosure. It should be understood that the disclosure disclosed and defined in this specification extends to all alternative combinations of two or more individual features mentioned or apparent in the text and/or drawings. All of these different combinations constitute alternative aspects of the present disclosure. The implementations described in this specification illustrate the best mode known for carrying out the present disclosure, and will enable those skilled in the art to utilize the present disclosure.

What is claimed is:

1. An energy management method, comprising:

obtaining a first current output power and a previous output power of a first energy supplier;

obtaining a current power change rate of the first energy supplier according to the first current output power and the previous output power;

obtaining a first reference power of the first energy supplier according to the first current output power, the previous output power and the current power change rate;

obtaining a second current output power of a second energy supplier;

obtaining a second reference power of the second energy supplier according to the first current output power, the second current output power and the first reference power;

obtaining a current flow rate of a first gas, a current flow rate of a second gas and a current furnace temperature; wherein the first energy supplier is connected to a gas conversion device, the first gas is converted into the second gas through the gas conversion device, the second gas is used for the first energy supplier to generate electricity, and the current furnace temperature is a current temperature of a furnace in the gas conversion device; and obtaining a reference flow rate of the first gas and a reference furnace temperature according to the current flow rate of the first gas, the current flow rate of the second gas, and the current furnace temperature.

2. The method according to claim 1, wherein obtaining the first reference power of the first energy supplier according to the first current output power, the previous output power and the current power change rate, comprises:

obtaining a first preset power threshold of the first energy supplier;

obtaining a first current limited power of the first energy supplier according to the first current output power and the first preset power threshold;

obtaining a previous limited power of the first energy supplier according to the previous output power and the first preset power threshold;

obtaining a power change rate threshold of the first energy supplier;

obtaining the first reference power according to the first current limited power, the previous limited power, the current power change rate and the power change rate threshold.

3. The method according to claim 2, wherein the power change rate threshold comprises a maximum power change rate and a minimum power change rate;

obtaining the first reference power according to the first current limited power, the previous limited power, the current power change rate and the power change rate threshold comprises:

obtaining a maximum dynamic power variable and a minimum dynamic power variable of the first energy supplier according to the maximum power change rate and the minimum power change rate;

obtaining the first reference power according to the current power change rate, the maximum power change rate, the minimum power change rate, the first current limited power, the previous limited power, the maximum dynamic power variable and the minimum dynamic power variable.

4. The method according to claim 3, wherein obtaining the first reference power according to the current power change rate, the maximum power change rate, the minimum power change rate, the first current limited power, the previous limited power, the maximum dynamic power variable and the minimum dynamic power variable, comprises:

$$\text{if } R_{pfc,min} \le R_{pfc}(t_k) \le R_{pfc,max}, \text{ then } {}^*P_{fcr}(t_k) = {}^*P_{fcl}(t_k);$$

$$\text{if } R_{pfc}(t_k) < R_{pfc,min}, \text{ then } {}^*P_{fcr}(t_k) = {}^*P_{fcl}(t_{k-1}) + \Delta P_{fc,min};$$

$$\text{if } R_{pfc}(t_k) > R_{pfc,max}, \text{ then } {}^*P_{fcr}(t_k) = {}^*P_{fcl}(t_{k-1}) + \Delta P_{fc,max};$$

wherein $R_{pfc}$, min is the minimum power change rate, $R_{pfc,max}$ is the maximum power change rate, $R_{pfc}(t_k)$ is the current power change rate, $*P_{fcr}(t_k)$ is the first reference power, $*P_{fcl}(t_k)$ is the first current limited power, $*P_{fcl}(t_{k-1})$ is the previous limited power, $\Delta P_{fc,min}$ is the minimum dynamic power variable, $\Delta P_{fc,max}$ is the maximum dynamic power variable, $t_k$ represents a current moment, $t_{k-1}$ represents a previous moment, k≥1 and is a positive integer.

5. The method according to claim 1, wherein obtaining the second reference power of the second energy supplier according to the first current output power, the second current output power and the first reference power, comprises:

obtaining a second preset power threshold of the second energy supplier;

obtaining the second reference power according to the first current output power, the second current output power, the first reference power and the second preset power threshold.

6. The method according to claim 1, wherein obtaining the reference flow rate of the first gas and the reference furnace temperature according to the current flow rate of the first gas, the current flow rate of the second gas and the current furnace temperature, comprises:

in a case that the current furnace temperature minus a preset furnace temperature step size is greater than a minimum preset furnace temperature, regulating the current flow rate of the first gas to maintain the current flow rate of the second gas to be stable; in a case that the regulated flow rate of the first gas is within a preset range, continuing to reduce a furnace temperature according to the preset furnace temperature step size and continuing to regulate the flow rate of the first gas to maintain the current flow rate of the second gas to be stable;

in a case that the current furnace temperature minus one preset furnace temperature step size or multiple preset furnace temperature step sizes is greater than the minimum preset furnace temperature, and the regulated flow rate of the first gas is outside the preset range, regulating the flow rate of the first gas to a maximum flow rate or a minimum flow rate to obtain the reference flow rate of the first gas, and regulating the furnace temperature to obtain the reference furnace temperature to maintain the current flow rate of the second gas to be stable;

in a case that the current furnace temperature minus one preset furnace temperature step size or multiple preset furnace temperature step sizes is less than or equal to the minimum preset furnace temperature, regulating the reduced furnace temperature to the minimum preset furnace temperature to obtain the reference furnace temperature, and regulating the flow rate of the first gas to obtain the reference flow rate of the first gas to maintain the current flow rate of the second gas to be stable.

7. The method according to claim 1, wherein the first energy supplier comprises a fuel cell, and the second energy supplier comprises a super-capacitor and a battery;

obtaining the first current output power of the first energy supplier and obtaining the second current output power of the second energy supplier comprises:

obtaining a current load power, a current state of energy of the super-capacitor, and a current state of charge of the battery;

obtaining the first current output power and the second current output power according to the current load power, the current state of energy and the current state of charge.

8. A computer device, comprising: a processor, a memory, an input interface and an output interface; wherein the processor is connected to the memory, the input interface and the output interface respectively, wherein the input interface and the output interface are configured to receive data and output data respectively, the memory is configured to store a computer program, and the processor is configured to call the computer program, so that the computer device executes:

obtaining a first current output power and a previous output power of a first energy supplier;

obtaining a current power change rate of the first energy supplier according to the first current output power and the previous output power;

obtaining a first reference power of the first energy supplier according to the first current output power, the previous output power and the current power change rate;

obtaining a second current output power of a second energy supplier;

obtaining a second reference power of the second energy supplier according to the first current output power, the second current output power and the first reference power;

obtaining a current flow rate of a first gas, a current flow rate of a second gas and a current furnace temperature; wherein the first energy supplier is connected to a gas conversion device, the first gas is converted into the second gas through the gas conversion device, the second gas is used for the first energy supplier to generate electricity, and the current furnace temperature is a current temperature of a furnace in the gas conversion device; and obtaining a reference flow rate of the first gas and a reference furnace temperature according to the current flow rate of the first gas, the current flow rate of the second gas, and the current furnace temperature.

9. The computer device according to claim 8, wherein the processor is further configured to execute:

obtaining a first preset power threshold of the first energy supplier;

obtaining a first current limited power of the first energy supplier according to the first current output power and the first preset power threshold;

obtaining a previous limited power of the first energy supplier according to the previous output power and the first preset power threshold;

obtaining a power change rate threshold of the first energy supplier;

obtaining the first reference power according to the first current limited power, the previous limited power, the current power change rate and the power change rate threshold.

10. The computer device according to claim 9, wherein the power change rate threshold comprises a maximum power change rate and a minimum power change rate;

wherein the processor is further configured to execute:

obtaining a maximum dynamic power variable and a minimum dynamic power variable of the first energy supplier according to the maximum power change rate and the minimum power change rate;

obtaining the first reference power according to the current power change rate, the maximum power change rate, the minimum power change rate, the first current limited power, the previous limited power, the maximum dynamic power variable and the minimum dynamic power variable.

11. The computer device according to claim 10, wherein the processor is further configured to execute:

$$\text{if } R_{pfc,min} \le R_{pfc}(t_k) \le R_{pfc,max}, \text{ then } {}^*P_{fcr}(t_k) = {}^*P_{fcl}(t_k);$$

$$\text{if } R_{pfc}(t_k) < R_{pfc,min}, \text{ then } {}^*P_{fcr}(t_k) = {}^*P_{fcl}(t_{k-1}) + \Delta P_{fc,min};$$

$$\text{if } R_{pfc}(t_k) > R_{pfc,max}, \text{ then } {}^*P_{fcr}(t_k) = {}^*P_{fcl}(t_{k-1}) + \Delta P_{fc,max};$$

wherein $R_{pfc,min}$ is the minimum power change rate, $R_{pfc,max}$ is the maximum power change rate, $R_{pfc}(t_k)$ is the current power change rate, $^*P_{fcr}(t_k)$ is the first reference power, $^*P_{fcl}(t_k)$ is the first current limited power, $^*P_{fcl}(t_{k-1})$ is the previous limited power, $\Delta P_{fc,min}$ is the minimum dynamic power variable, $\Delta P_{fc,max}$ is the maximum dynamic power variable, $t_k$ represents a current moment, $t_{k-1}$ represents a previous moment, $k \ge 1$ and is a positive integer.

12. The computer device according to claim 8, wherein the processor is further configured to execute:

obtaining a second preset power threshold of the second energy supplier;

obtaining the second reference power according to the first current output power, the second current output power, the first reference power and the second preset power threshold.

13. The computer device according to claim 8, wherein the processor is further configured to execute:

in a case that the current furnace temperature minus a preset furnace temperature step size is greater than a minimum preset furnace temperature, regulating the current flow rate of the first gas to maintain the current flow rate of the second gas to be stable; in a case that the regulated flow rate of the first gas is within a preset range, continuing to reduce a furnace temperature according to the preset furnace temperature step size and continuing to regulate the flow rate of the first gas to maintain the current flow rate of the second gas to be stable;

in a case that the current furnace temperature minus one preset furnace temperature step size or multiple preset furnace temperature step sizes is greater than the minimum preset furnace temperature, and the regulated flow rate of the first gas is outside the preset range, regulating the flow rate of the first gas to a maximum flow rate or a minimum flow rate to obtain the reference flow rate of the first gas, and regulating the furnace temperature to obtain the reference furnace temperature to maintain the current flow rate of the second gas to be stable;

in a case that the current furnace temperature minus one preset furnace temperature step size or multiple preset furnace temperature step sizes is less than or equal to the minimum preset furnace temperature, regulating the reduced furnace temperature to the minimum preset furnace temperature to obtain the reference furnace temperature, and regulating the flow rate of the first gas to obtain the reference flow rate of the first gas to maintain the current flow rate of the second gas to be stable.

14. The computer device according to claim 8, wherein the first energy supplier comprises a fuel cell, and the second energy supplier comprises a super-capacitor and a battery;

wherein the processor is further configured to execute obtaining a current load power, a current state of energy of the super-capacitor, and a current state of charge of the battery;

obtaining the first current output power and the second current output power according to the current load power, the current state of energy and the current state of charge.

15. A computer-readable storage medium, wherein the computer-readable storage medium stores a computer program, and the computer program is adapted to be loaded and executed by a processor, so that a computer device having the processor executes:

obtaining a first current output power and a previous output power of a first energy supplier;

obtaining a current power change rate of the first energy supplier according to the first current output power and the previous output power;

obtaining a first reference power of the first energy supplier according to the first current output power, the previous output power and the current power change rate;

obtaining a second current output power of a second energy supplier;

obtaining a second reference power of the second energy supplier according to the first current output power, the second current output power and the first reference power;

obtaining a current flow rate of a first gas, a current flow rate of a second gas and a current furnace temperature; wherein the first energy supplier is connected to a gas conversion device, the first gas is converted into the second gas through the gas conversion device, the second gas is used for the first energy supplier to generate electricity, and the current furnace temperature is a current temperature of a furnace in the gas conversion device; and obtaining a reference flow rate of the first gas and a reference furnace temperature according to the current flow rate of the first gas, the current flow rate of the second gas, and the current furnace temperature.

16. The computer-readable storage medium according to claim 15, wherein the processor is further configured to execute:

obtaining a first preset power threshold of the first energy supplier;

obtaining a first current limited power of the first energy supplier according to the first current output power and the first preset power threshold;

obtaining a previous limited power of the first energy supplier according to the previous output power and the first preset power threshold;

obtaining a power change rate threshold of the first energy supplier;

obtaining the first reference power according to the first current limited power, the previous limited power, the current power change rate and the power change rate threshold.

17. The computer-readable storage medium according to claim 16, wherein the power change rate threshold comprises a maximum power change rate and a minimum power change rate;

wherein the processor is further configured to execute:

obtaining a maximum dynamic power variable and a minimum dynamic power variable of the first energy supplier according to the maximum power change rate and the minimum power change rate;

obtaining the first reference power according to the current power change rate, the maximum power change rate, the minimum power change rate, the first current limited power, the previous limited power, the maximum dynamic power variable and the minimum dynamic power variable.

18. The computer-readable storage medium according to claim 17, wherein the processor is further configured to execute:

$$\text{if } R_{pfc,min} \le R_{pfc}(t_k) \le R_{pfc,max}, \text{ then } {}^*P_{fcr}(t_k) = {}^*P_{fcl}(t_k);$$

$$\text{if } R_{pfc}(t_k) < R_{pfc,min}, \text{ then } {}^*P_{fcr}(t_k) = {}^*P_{fcl}(t_{k-1}) + \Delta P_{fc,min};$$

$$\text{if } R_{pfc}(t_k) > R_{pfc,max}, \text{ then } {}^*P_{fcr}(t_k) = {}^*P_{fcl}(t_{k-1}) + \Delta P_{fc,max};$$

wherein $R_{pfc,min}$ is the minimum power change rate, $R_{pfc,max}$ is the maximum power change rate, $R_{pfc}(t_k)$ is the current power change rate, $^*P_{fcr}(t_k)$ is the first reference power, $^*P_{fcl}(t_k)$ is the first current limited power, $^*P_{fcl}(t_{k-1})$ is the previous limited power, $\Delta P_{fc,min}$ is the minimum dynamic power variable, $\Delta P_{fc,max}$ is the maximum dynamic power variable, $t_k$ represents a current moment, $t_{k-1}$ represents a previous moment, $k \geq 1$ and is a positive integer.

19. The computer-readable storage medium according to claim 15, wherein the processor is further configured to execute:

obtaining a second preset power threshold of the second energy supplier;

obtaining the second reference power according to the first current output power, the second current output power, the first reference power and the second preset power threshold.

20. The computer-readable storage medium according to claim 15, wherein the processor is further configured to execute:

in a case that the current furnace temperature minus a preset furnace temperature step size is greater than a minimum preset furnace temperature, regulating the current flow rate of the first gas to maintain the current flow rate of the second gas to be stable; in a case that the regulated flow rate of the first gas is within a preset range, continuing to reduce a furnace temperature according to the preset furnace temperature step size and continuing to regulate the flow rate of the first gas to maintain the current flow rate of the second gas to be stable;

in a case that the current furnace temperature minus one preset furnace temperature step size or multiple preset furnace temperature step sizes is greater than the minimum preset furnace temperature, and the regulated flow rate of the first gas is outside the preset range, regulating the flow rate of the first gas to a maximum flow rate or a minimum flow rate to obtain the reference flow rate of the first gas, and regulating the furnace temperature to obtain the reference furnace temperature to maintain the current flow rate of the second gas to be stable;

in a case that the current furnace temperature minus one preset furnace temperature step size or multiple preset furnace temperature step sizes is less than or equal to the minimum preset furnace temperature, regulating the reduced furnace temperature to the minimum preset furnace temperature to obtain the reference furnace temperature, and regulating the flow rate of the first gas to obtain the reference flow rate of the first gas to maintain the current flow rate of the second gas to be stable.

* * * * *